(12) United States Patent
Matsumoto et al.

(10) Patent No.: US 8,867,113 B2
(45) Date of Patent: Oct. 21, 2014

(54) LASER PROCESSING DEVICE AND LASER PROCESSING METHOD

(75) Inventors: Naoya Matsumoto, Hamamatsu (JP);
Takashi Inoue, Hamamatsu (JP);
Norihiro Fukuchi, Hamamatsu (JP);
Haruyasu Ito, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 644 days.

(21) Appl. No.: 13/060,614

(22) PCT Filed: Aug. 24, 2009

(86) PCT No.: PCT/JP2009/064725
§ 371 (c)(1),
(2), (4) Date: Apr. 14, 2011

(87) PCT Pub. No.: WO2010/024218
PCT Pub. Date: Mar. 4, 2010

(65) Prior Publication Data
US 2011/0181929 A1    Jul. 28, 2011

(30) Foreign Application Priority Data

Aug. 26, 2008   (JP) .................................. 2008-216742

(51) Int. Cl.
*G02B 5/32* (2006.01)
*B23K 3/00* (2006.01)
*B23K 26/06* (2014.01)

(52) U.S. Cl.
CPC .............. *B23K 26/0656* (2013.01); *G02B 5/32* (2013.01); *B23K 26/0643* (2013.01)
USPC ......................................... 359/15; 219/85.12

(58) Field of Classification Search
USPC ......................... 359/1, 9, 29, 35; 219/121.61
See application file for complete search history.

(56) References Cited

U.S. PATENT DOCUMENTS

| 6,710,292 B2 * | 3/2004 | Fukuchi et al. .......... 219/121.73 |
| 2003/0010889 A1 * | 1/2003 | Igasaki et al. .............. 250/201.9 |

FOREIGN PATENT DOCUMENTS

| CN | 1650678 | 8/2005 |
| JP | 2723798 | 11/1997 |
| JP | 2001-272636 | 10/2001 |
| JP | 2004-122233 | 4/2004 |
| JP | 2006-119427 | 5/2006 |

* cited by examiner

*Primary Examiner* — Ricky Mack
*Assistant Examiner* — Robert E Tallman
(74) *Attorney, Agent, or Firm* — Drinker Biddle & Reath LLP

(57) ABSTRACT

A laser processing device includes a laser light source, a spatial light modulator, a control section, and a condensing optical system. The spatial light modulator, presents a hologram for modulating the phase of the laser light in each of a plurality of two-dimensionally arrayed pixels, and outputs the phase-modulated laser light. The control section causes a part of the phase-modulated laser light (incident light) to be condensed at a condensing position in a processing region as a laser light (contribution light) having a constant energy not less than a predetermined threshold X. The control section causes a laser light (unnecessary light) other than the contribution light condensed to the condensing position existing in the processing region to be dispersed and condensed at a condensing position existing in a non-processing region as a plurality of laser lights (non-contribution lights) having an energy less than the predetermined threshold.

14 Claims, 31 Drawing Sheets

|  | Measuring point [GW/cm$^2$] | | | | |
| --- | --- | --- | --- | --- | --- |
|  | 1 | 2 | 3 | 4 | 5 |
| 2-point processing | 2 | 2.050 | — | — | — |
| 4-point processing | 1 | 1.020 | 1.075 | 1.095 | — |

Fig.18

| | Measuring point within processing region 91 [GW/cm$^2$] | | | | Measuring point within non-processing region 92 [GW/cm$^2$] | | | | | | | |
|---|---|---|---|---|---|---|---|---|---|---|---|---|
| | 1 | 2 | 3 | 4 | 1 | 2 | 3 | 4 | 5 | 6 | 7 | 8 |
| 2-point processing | 1 | 0.990 | – | – | 0.250 | 0.245 | 0.255 | 0.251 | 0.252 | 0.249 | 0.257 | 0.254 |
| 4-point processing | 1 | 1.010 | 0.990 | 1.020 | – | – | – | – | – | – | – | – |

|  | Laser light energy equivalent to one dot [GW/cm$^2$] |
|---|---|
| PatternA | 1 |
| PatternB | 0.250 |
| PatternC | 1.010 |

LASER PROCESSING DEVICE AND LASER PROCESSING METHOD

TECHNICAL FIELD

The present invention relates to a device and method for processing a processing object by condensing and irradiating laser light to the processing object.

BACKGROUND ART

Condensing by a condensing optical system a laser light output from a laser light source and irradiating the laser light to a processing object allows processing the processing object. If by simply condensing laser light by use of a lens, scanning laser light to one condensing position allows processing a processing object into a desired shape. However, the time required for processing is long in this case.

The simplest method for shortening the processing time is to perform multi-point simultaneous processing by simultaneously condensing and irradiating laser light to a plurality of condensing positions. For example, using a plurality of laser light sources and condensing laser lights output from the respective laser light sources by a lens allows performing multi-point simultaneous processing. However, in this case, a plurality of laser light sources are used, which thus results in a high cost and a complicated installation area and optical system.

An invention that intends to solve such problems has been disclosed in Patent Literature 1. In this invention disclosed in Patent Literature 1, a hologram is presented on a phase modulating spatial light modulator, a laser light output from one laser light source is phase-modulated by the spatial light modulator, and the phase-modulated laser light is simultaneously condensed and irradiated to a plurality of positions by a condensing optical system. The hologram presented on the spatial light modulator has such a phase modulation distribution that laser light is condensed to a plurality of condensing positions by a condensing optical system.

CITATION LIST

Patent Literature

Patent Literature 1: Japanese Patent No. 2723798

SUMMARY OF INVENTION

Technical Problem

Meanwhile, in the invention disclosed in Patent Literature 1, it is desirable that the energy of laser light to be irradiated to each of a plurality of condensing positions is uniform. In this case, the energy of laser light to be irradiated to the respective condensing positions is generally inversely proportional to the number of condensing positions or the area of a condensing region. For example, when there are two condensing positions, the energy of laser light to be irradiated to the respective condensing positions is one-half as compared to when there is one condensing position.

On the other hand, it is known that, when performing processing of a metal surface by abrasion by use of a femtosecond laser light, the abrasion ratio is different depending on the laser light energy. That is, in the invention disclosed in Patent Literature 1, due to a variation in the number of condensing positions, the energy of laser light to be irradiated to the condensing positions varies, so that the degree of processing in the respective condensing positions varies.

It can be considered, in order to solve such problems, to maintain the energy of laser light to be irradiated to the respective condensing positions constant irrespective of the number of condensing positions by inserting an ND (Neutral Density) filter with a necessary attenuation factor according to the number of condensing positions. However, replacing the ND filter every time the number of condensing positions is changed results in a significant reduction in efficiency.

The present invention has been made for solving the above problems, and an object thereof is to provide a device and method for processing a processing region of a processing object by simultaneously irradiating laser light to a plurality of condensing positions or a condensing region having a constant area by use of a phase modulating spatial light modulator where a hologram is presented, and that easily allows, even when the number of condensing positions of laser light in the processing region or the area of the condensing region varies, maintaining the energy of laser light to be irradiated to the respective condensing positions or condensing region almost constant.

Solution to Problem

In order to solve the above problems, a laser processing device of the present invention, which is a device for processing a processing object by condensing and irradiating laser light to the processing object, includes: a laser light source for outputting laser light; a phase modulating spatial light modulator for being input with a laser light output from the laser light source, presenting a hologram for modulating the phase of the laser light in each of a plurality of two-dimensionally arrayed pixels, and outputting the phase-modulated laser light; a condensing optical system provided at a subsequent stage of the spatial light modulator; and a control section for causing the spatial light modulator to present a hologram for condensing the phase-modulated laser light output from the spatial light modulator to a plurality of condensing positions by the condensing optical system, and the control section causes the spatial light modulator to sequentially present a plurality of holograms, and causes, when having made the phase-modulated laser light output from the spatial light modulator where each of the holograms has been presented be input to the condensing optical system, at a condensing position existing in a processing region of the processing object out of the condensing positions, a part of the phase-modulated laser light to be condensed as a laser light having a constant energy not less than a predetermined threshold, while at a condensing position existing in a region other than the processing region out of the condensing positions, a remaining part of the phase-modulated laser light to be condensed as a plurality of laser lights having an energy less than the threshold, thereby processing the processing object.

In this case, it is preferable that the threshold is a value indicating an energy of laser light to start processing of the processing region.

Moreover, it is preferable that, when an energy of the phase-modulated laser light is the same as that for processing a predetermined processing region that requires the greatest energy for processing, the control section causes the entire part of the phase-modulated laser light to be condensed, as a plurality of laser lights having a constant energy not less than the threshold, to a plurality of condensing positions existing in the predetermined processing region, respectively.

Moreover, it is preferable that the processing region exists inside of the processing object, and a condensing position existing in the processing region with reference to a bottom surface of the processing object and a condensing position existing in a region other than the processing region with reference to the bottom surface are different in height from each other.

Moreover, a laser processing method of the present invention, which is a method for processing a processing object by condensing and irradiating laser light to the processing object, uses: a laser light source for outputting laser light; a phase modulating spatial light modulator for being input with a laser light output from the laser light source, presenting a hologram for modulating the phase of the laser light in each of a plurality of two-dimensionally arrayed pixels, and outputting the phase-modulated laser light; a condensing optical system provided at a subsequent stage of the spatial light modulator; and a control section for causing the spatial light modulator to present a hologram for condensing the phase-modulated laser light output from the spatial light modulator to a plurality of condensing positions by the condensing optical system, and the laser processing method causes, by the control section, the spatial light modulator to sequentially present a plurality of holograms, and when having made the phase-modulated laser light output from the spatial light modulator where each of the holograms has been presented be input to the condensing optical system, at a condensing position existing in a processing region of the processing object out of the condensing positions, a part of the phase-modulated laser light to be condensed as a laser light having a constant energy not less than a predetermined threshold, while at a condensing position existing in a region other than the processing region out of the condensing positions, a remaining part of the phase-modulated laser light to be condensed as a plurality of laser lights having an energy less than the threshold, thereby processing the processing object.

In this case, it is preferable that the threshold is a value indicating an energy of laser light to start processing of the processing region.

Moreover, it is preferable to cause, when an energy of the phase-modulated laser light is the same as that for processing a predetermined processing region that requires the greatest energy for processing, by the control section, the entire part of the phase-modulated laser light to be condensed, as a plurality of laser lights having a constant energy not less than the threshold, to a plurality of condensing positions existing in the predetermined processing region, respectively.

Moreover, it is preferable that, the processing region exists inside of the processing object, and a condensing position existing in the processing region with reference to a bottom surface of the processing object and a condensing position existing in a region other than the processing region with reference to the bottom surface are different in height from each other.

In the laser processing device and the laser processing method of the present invention, a part of the phase-modulated laser light (incident light) is condensed as a laser light (contribution light) having a constant energy not less than a predetermined threshold X at a condensing position existing in a processing region. On the other hand, a laser light (unnecessary light) other than the contribution light condensed to the condensing position existing in the processing region is dispersed and condensed at a condensing position existing in a region other than the processing region as a plurality of laser lights (non-contribution lights) having an energy less than the predetermined threshold X. Thus, by treating the unnecessary light as a non-contribution light having an energy less than the predetermined threshold X so as not to contribute to processing, even when the number of condensing positions in the processing region varies, the energy of the contribution light can be maintained constant.

Moreover, a laser processing device of the present invention, which is a device for processing a processing object by condensing and irradiating laser light to the processing object, includes: a laser light source for outputting laser light; a phase modulating spatial light modulator for being input with a laser light output from the laser light source, presenting a hologram for modulating the phase of the laser light in each of a plurality of two-dimensionally arrayed pixels, and outputting the phase-modulated laser light; a condensing optical system provided at a subsequent stage of the spatial light modulator; and a control section for causing the spatial light modulator to present a hologram for condensing the phase-modulated laser light output from the spatial light modulator to a predetermined condensing region by the condensing optical system, and the control section causes the spatial light modulator to sequentially present a plurality of holograms, and causes, when having made the phase-modulated laser light output from the spatial light modulator where each of the holograms has been presented be input to the condensing optical system, in a condensing region existing in a processing region of the processing object of the predetermined condensing region, a part of the phase-modulated laser light to be condensed as a laser light having a constant energy not less than a predetermined threshold, while in a condensing region existing in a region other than the processing region of the predetermined condensing region, a remaining part of the phase-modulated laser light to be condensed as a laser light having an energy less than the threshold, thereby processing the processing object.

In this case, it is preferable that the threshold is a value indicating an energy of laser light to start processing of the processing region.

Moreover, it is preferable that, when an energy of the phase-modulated laser light is the same as that for processing a predetermined processing region that requires the greatest energy for processing, the control section causes the entire part of the phase-modulated laser light to be condensed, as a laser light having a constant energy not less than the threshold, to a condensing region existing in the predetermined processing region.

Moreover, it is preferable that the processing region exists inside of the processing object, and a condensing region existing in the processing region with reference to a bottom surface of the processing object and a condensing region existing in a region other than the processing region with reference to the bottom surface are different in height from each other.

Moreover, a laser processing method of the present invention, which is a method for processing a processing object by condensing and irradiating laser light to the processing object, uses: a laser light source for outputting laser light; a phase modulating spatial light modulator for being input with a laser light output from the laser light source, presenting a hologram for modulating the phase of the laser light in each of a plurality of two-dimensionally arrayed pixels, and outputting the phase-modulated laser light; a condensing optical system provided at a subsequent stage of the spatial light modulator; and a control section for causing the spatial light modulator to present a hologram for condensing the phase-modulated laser light output from the spatial light modulator to a predetermined condensing region by the condensing optical system, and the laser processing method causes, by the control section, the spatial light modulator to sequentially present a plurality of holograms, and when having made the phase-modulated laser light output from the spatial light modulator where each of the holograms has been presented be input to the condensing optical system, in a condensing region existing in a processing region of the processing object of the predetermined condensing region, a part of the phase-modulated laser light to be condensed as a laser light having a constant energy not less than a predetermined threshold, while in a condensing region existing in a region other than the processing region of the predetermined condensing region, a remaining part of the phase-modulated laser light to be condensed as a laser light having an energy less than the threshold, thereby processing the processing object.

In this case, it is preferable that the threshold is a value indicating an energy of laser light to start processing of the processing region.

Moreover, it is preferable to cause, when an energy of the phase-modulated laser light is the same as that for processing a predetermined processing region that requires the greatest energy for processing, by the control section, the entire part of the phase-modulated laser light to be condensed, as a laser light having a constant energy not less than the threshold, to a condensing region existing in the predetermined processing region.

Moreover, it is preferable that the processing region exists inside of the processing object, and a condensing region existing in the processing region with reference to a bottom surface of the processing object and a condensing region existing in a region other than the processing region with reference to the bottom surface are different in height from each other.

In the laser processing device and the laser processing method of the present invention, a part of the phase-modulated laser light (incident light) is condensed as a laser light (contribution light) having a constant energy not less than a predetermined threshold X in a condensing region existing in a processing region. On the other hand, a laser light (unnecessary light) other than the contribution light condensed to the condensing region existing in the processing region is dispersed and condensed at a condensing region existing in a region other than the processing region as a laser light (non-contribution light) having an energy less than the predetermined threshold X. Thus, by treating the unnecessary light as a non-contribution light having an energy less than the predetermined threshold X so as not to contribute to processing, even when the area of the condensing region in the processing region varies, the energy of the contribution light can be maintained constant.

Advantageous Effects of Invention

By the laser processing device or the laser processing method according to the present invention, a processing region of a processing object can be processed, by use of a phase modulating spatial light modulator where a hologram is presented, by simultaneously irradiating laser light to a plurality of condensing positions or a condensing region having a constant area. Moreover, even when the number of condensing positions of laser light in the processing region varies, or even when the area of the condensing region in the processing region varies, the energy of laser light to be irradiated to the respective condensing positions or condensing region can be easily maintained almost constant.

BRIEF DESCRIPTION OF DRAWINGS

FIG. 17 is a table summarizing laser light energies at respective condensing positions in the comparative example, in explanation of Example 1.

FIG. 18 is a table summarizing laser light energies at respective condensing positions in Example 1.

FIG. 20 is a table summarizing laser light energies in respective condensing regions in Example 2.

REFERENCE SIGNS LIST

Figure 1:
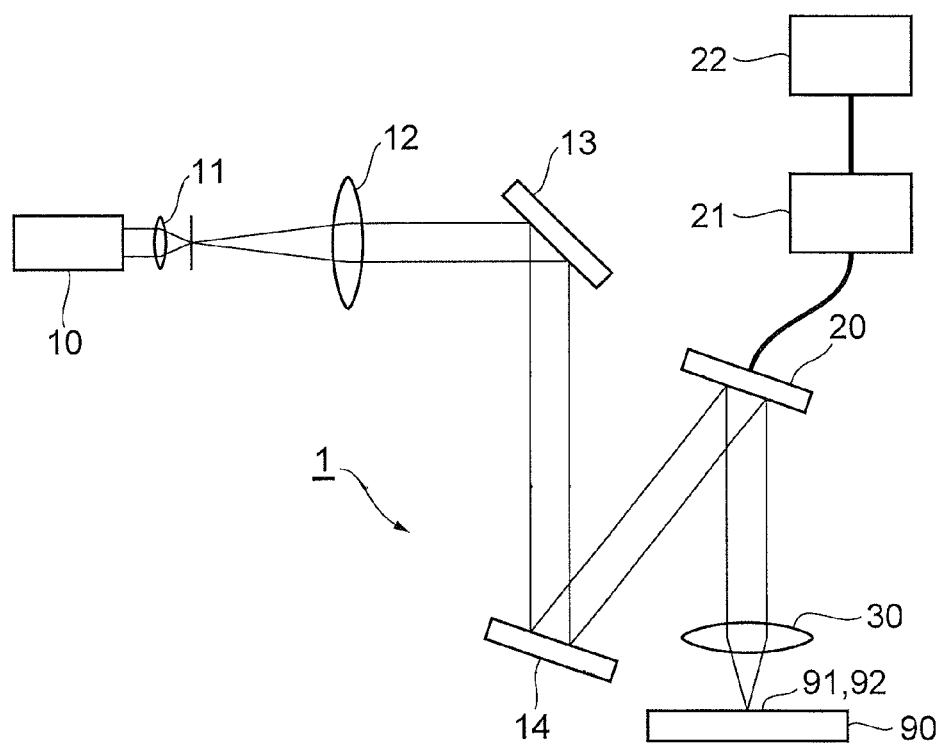
FIG. 1 is a view showing a configuration of a laser processing device 1 according to a first embodiment.

1 . . . laser processing device, 10 . . . laser light source, 11 . . . spatial filter, 12 . . . collimator lens, 13, 14 . . . mirror, 20 . . . spatial light modulator, 21 . . . drive section, 22 . . . control section, 30 . . . condensing optical system, 90 . . . processing optical system, 91 . . . processing region, 92 . . . non-processing region.

DESCRIPTION OF EMBODIMENTS

Hereinafter, the best mode for carrying out the present invention will be described in detail with reference to the accompanying drawings. Also, the same components will be denoted with the same reference numerals in the description of the drawings, and overlapping description will be omitted.

First Embodiment

Configuration of Laser Processing Device 1

First, description will be given of a first embodiment of a laser processing device and a laser processing method according to the present invention. FIG. 1 is a view showing a configuration of a laser processing device 1 according to the first embodiment. The laser processing device 1 shown in this figure is a device for processing a processing object 90 by condensing and irradiating laser light onto a processing region 91 and a region 92 (refer to FIG. 6 etc., to be described later) other than the processing region 91 in the processing object 90, and includes a laser light source 10, a spatial filter 11, a collimator lens 12, a mirror 13, a mirror 14, a spatial light modulator 20, a drive section 21, a control section 22, and a condensing optical system 30.

The laser light source 10 is for outputting laser light that needs to be irradiated to the processing region 91 of the processing object 90 and the region 92 other than the processing region 91, and is preferably a pulse laser light source such as a femtosecond laser light source and a Nd:YAG laser light source. A laser light output from this laser light source 10 passes through the spatial filter 11, and is then collimated by the collimator lens 12, reflected by the mirror 13 and the mirror 14, and input to the spatial light modulator 20.

The spatial light modulator 20 is of a phase modulation type, and input with a laser light output from the laser light source 10, presents a hologram for modulating the phase of the laser light in each of a plurality of two-dimensionally arrayed pixels, and outputs the phase-modulated laser light. The phase hologram to be presented in this spatial light modulator 20 is preferably a hologram (CGH: Computer-Generated Hologram) determined by numerical calculation.

This spatial light modulator 20 may be of a reflection type, and may be a transmission type. As a reflective spatial light modulator 20, any of the LCOS (Liquid Crystal on Silicon) type, MEMS (Micro Electro Mechanical Systems) type, and optical address type may be used. Moreover, as the transmissive spatial light modulator 20, an LCD (Liquid Crystal Display) or the like may be used. In FIG. 1, a reflection type is shown as the spatial light modulator 20.

The drive section 21 is for setting the phase modulation amount in each of a plurality of two-dimensionally arrayed pixels of the spatial light modulator 20, and provides a signal for setting the phase modulation amount of each pixel to the spatial light modulator 20. The drive section 21 sets the phase modulation amount in each of a plurality of two-dimensionally arrayed pixels of the spatial light modulator 20 to thereby cause the spatial light modulator 20 to present a hologram.

The condensing optical system 30 is provided at a subsequent stage of the spatial light modulator 20, and input with a laser light phase-modulated and output for each pixel in the spatial light modulator 20. Particularly, this condensing optical system 30 includes a lens that Fourier transforms a laser light output from the spatial light modulator 20. A Fourier-transformed image thereof is formed on a back focal plane of the Fourier transforming lens.

The control section 22 is formed of, for example, a computer, and controls operation of the drive section 21 to thereby cause a hologram to be written from the drive section 21 into the spatial light modulator 20. At this time, the control section 22 causes the spatial light modulator 20 to present a hologram for condensing a laser light output from the spatial light modulator 20 to a plurality of condensing positions by the condensing optical system 30.

Particularly, in the present embodiment, the control section 22 causes the spatial light modulator 20 to sequentially present a plurality of holograms. Then, the control section 22, when having made a phase-modulated laser light output from the spatial light modulator 20 where a plurality of holograms have been respectively presented be input to the condensing optical system 30, at a condensing position existing in the processing region 91 (refer to FIG. 6 etc.) out of a plurality of condensing positions in the processing object 90, causes a part of the phase-modulated laser light to be condensed as a laser light ("contribution light" as to be described later) having a constant energy (intensity) not less than a predetermined threshold X. On the other hand, the control section 22, at a condensing position existing in the region 92 (refer to FIG. 6 etc.) other than the processing region 91 out of the condensing positions in the processing object 90, causes a remaining part of the phase-modulated laser light to be dispersed and condensed as a plurality of laser lights ("non-contribution lights" as to be described later) having a weak energy less than the threshold X to thereby process the processing object 90.

Figure 2:
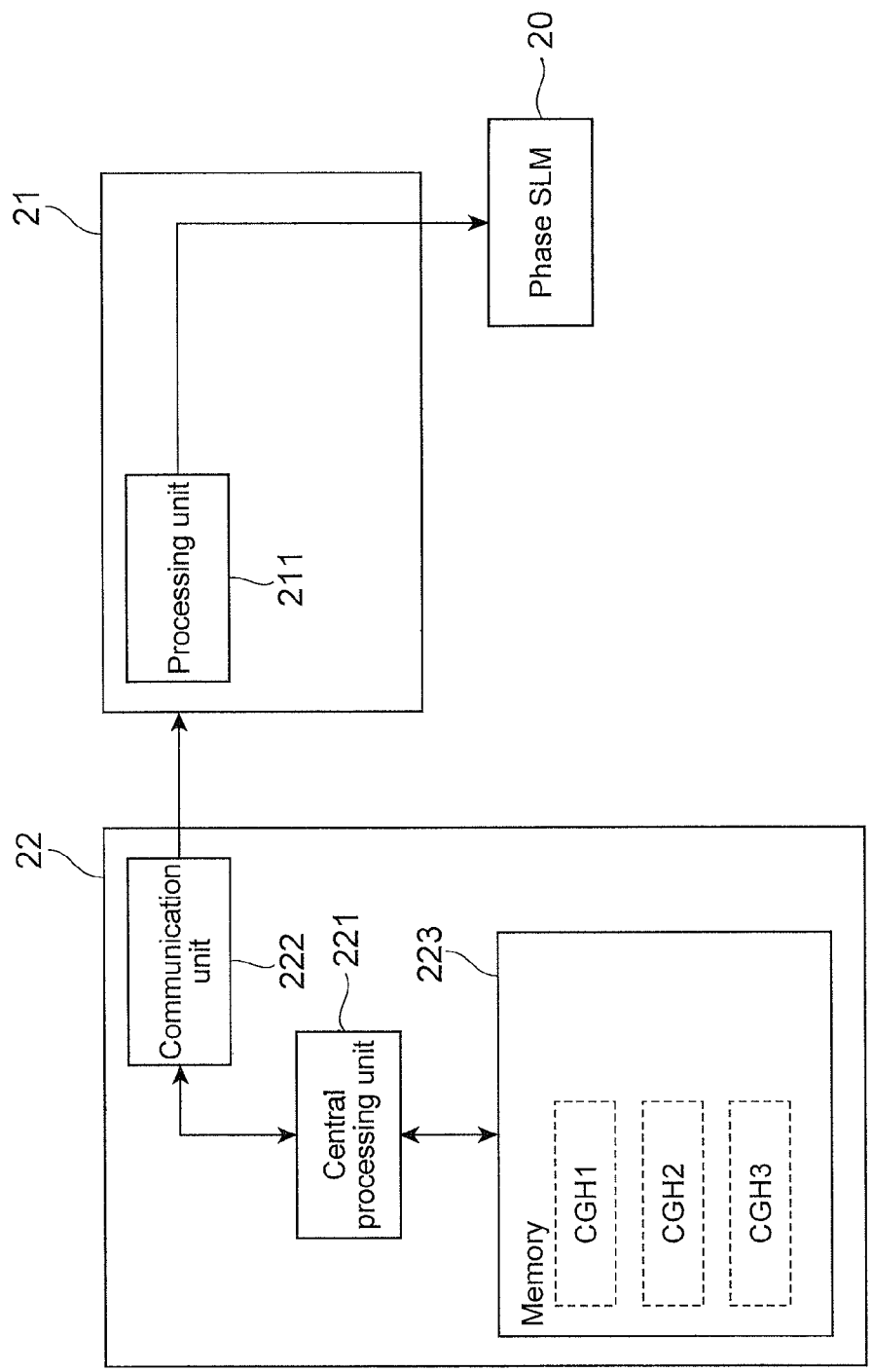
FIG. 2 is a view explaining a first mode of writing a hologram from a drive section 21 into a spatial light modulator 20 by a control section 22 in the laser processing device 1 according to the first embodiment.
Figure 3:
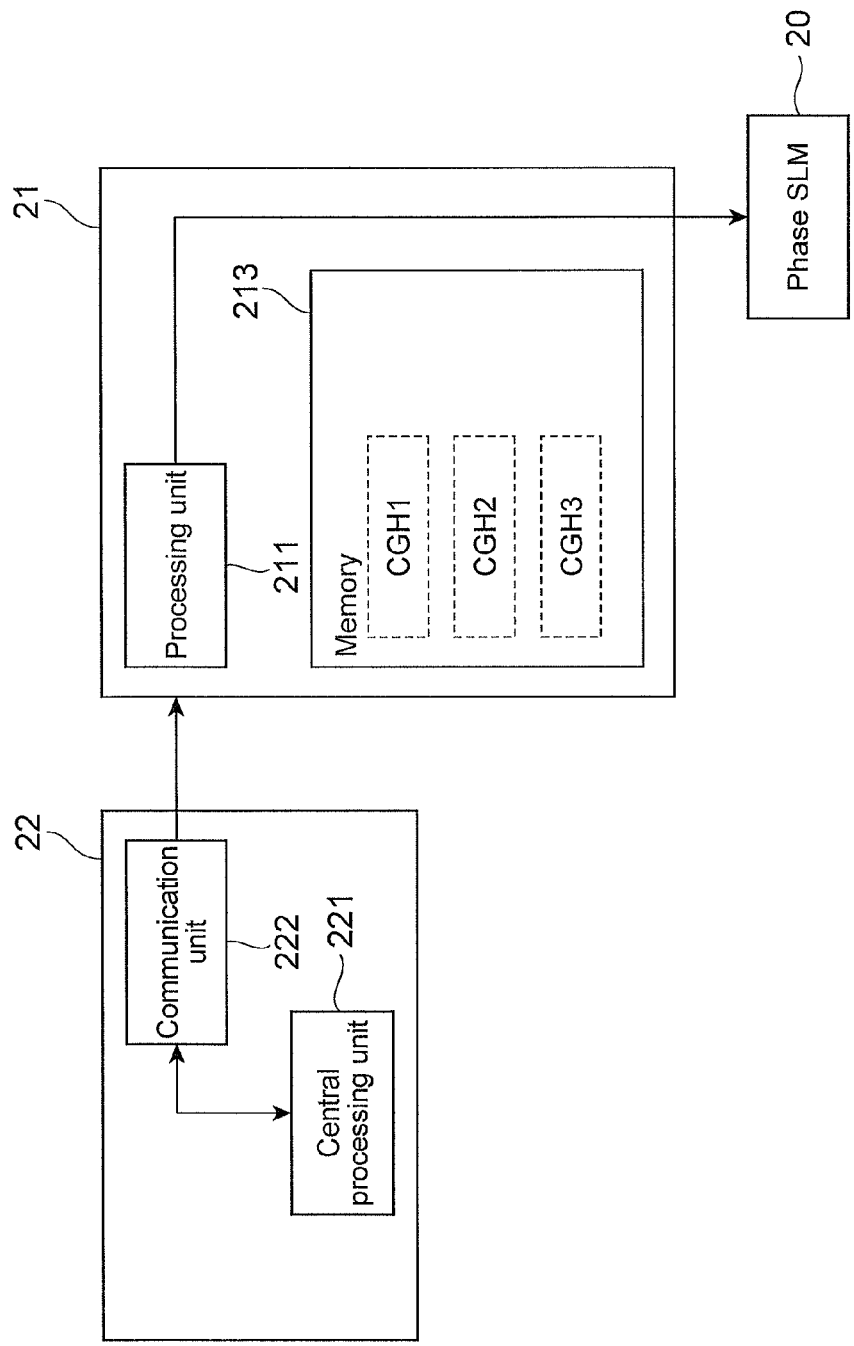
FIG. 3 is a view explaining a second mode of writing a hologram from the drive section 21 into the spatial light modulator 20 by the control section 22 in the laser processing device 1 according to the first embodiment.
Figure 4:
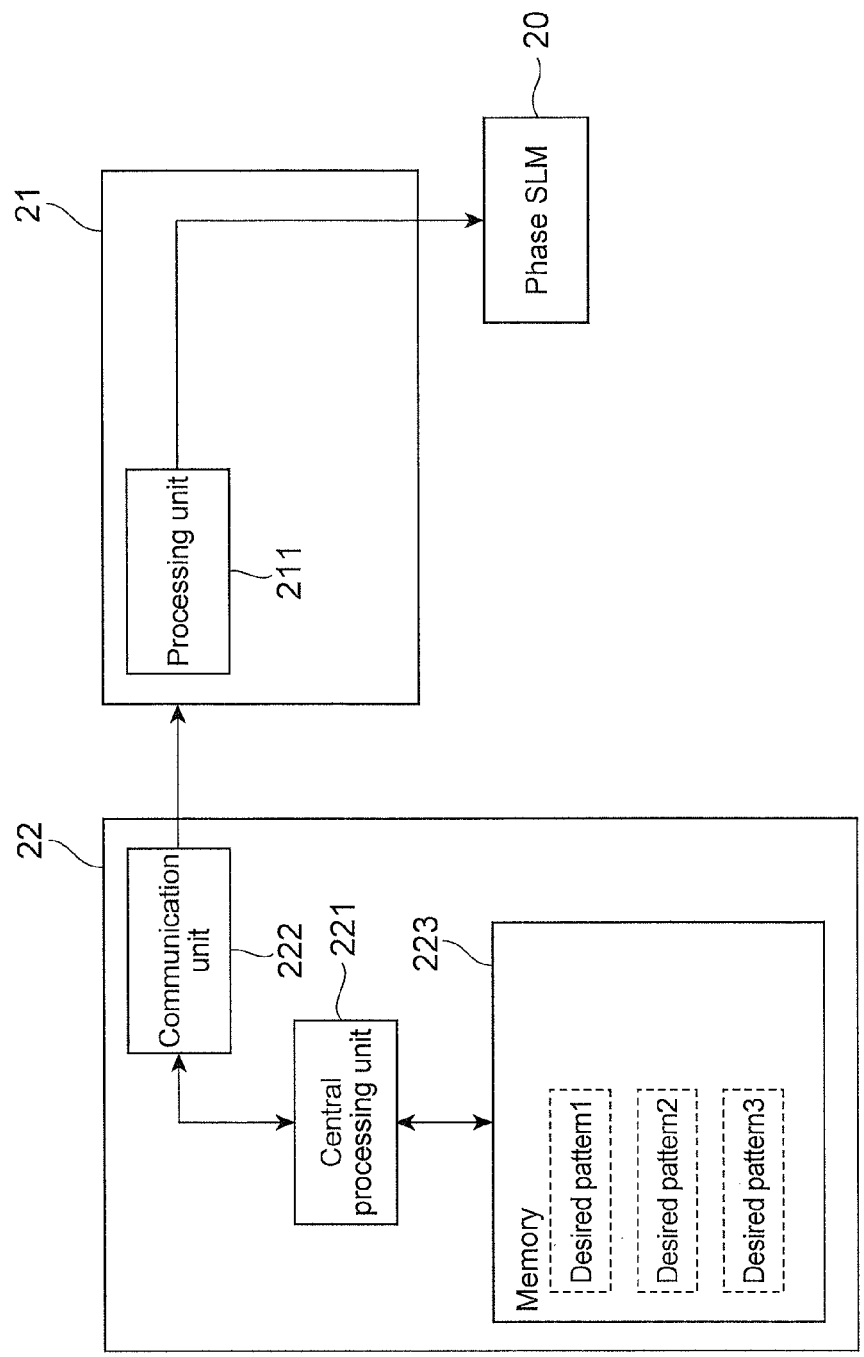
FIG. 4 is a view explaining a third mode of writing a hologram from the drive section 21 into the spatial light modulator 20 by the control section 22 in the laser processing device 1 according to the first embodiment.

FIG. 2 to FIG. 4 are each a view explaining a mode of writing a hologram from the drive section 21 into the spatial light modulator 20 by the control section 22 in the laser processing device 1 according to the first embodiment.

In a first mode shown in FIG. 2, the control section 22 includes a central processing unit 221, a communication unit 222, and a memory unit 223. The central processing unit 221 creates in advance data of a plurality of holograms CGH1 to CGH3 needed to cause the spatial light modulator 20 to present, and stores the data in the memory unit 223. For causing the spatial light modulator 20 to present a hologram, the central processing unit 221 reads hologram data out of the memory unit 223, and sends the read-out hologram data to the communication unit 222, and the communication unit 222 transmits the hologram data to a processing unit 211 of the drive section 21. Then, the processing unit 211 of the drive section 21 sends the hologram data received from the control section 22 to the spatial light modulator 20, and causes the spatial light modulator 20 to present a hologram.

In a second mode shown in FIG. 3, a memory unit 213 of the drive section 21 stores in advance data of a plurality of holograms CGH1 to CGH3 needed to cause the spatial light modulator 20 to present. For causing the spatial light modulator 20 to present a hologram, the control section 22 specifies, for the drive section 21, hologram data stored in the memory unit 213, causes the specified hologram data to be sent to the spatial light modulator 20, and causes the spatial light modulator 20 to present a hologram.

In a third mode shown in FIG. 4, the memory unit 223 included in the control section 22 stores in advance data of desired patterns 1 to 3 of condensing positions when laser light is condensed by the condensing optical system 30. For causing the spatial light modulator 20 to present a hologram, the central processing unit 221 reads desired pattern data out of the memory unit 223, creates a hologram that can reproduce the read-out desired pattern, and sends data of the hologram to the communication unit 222, and the communication unit 222 transmits the hologram data to the processing unit 211 of the drive section 21. Then, the processing unit 211 of the drive section 21 sends the hologram data received from the control section 22 to the spatial light modulator 20, and causes the spatial light modulator 20 to present a hologram.

Figure 21:
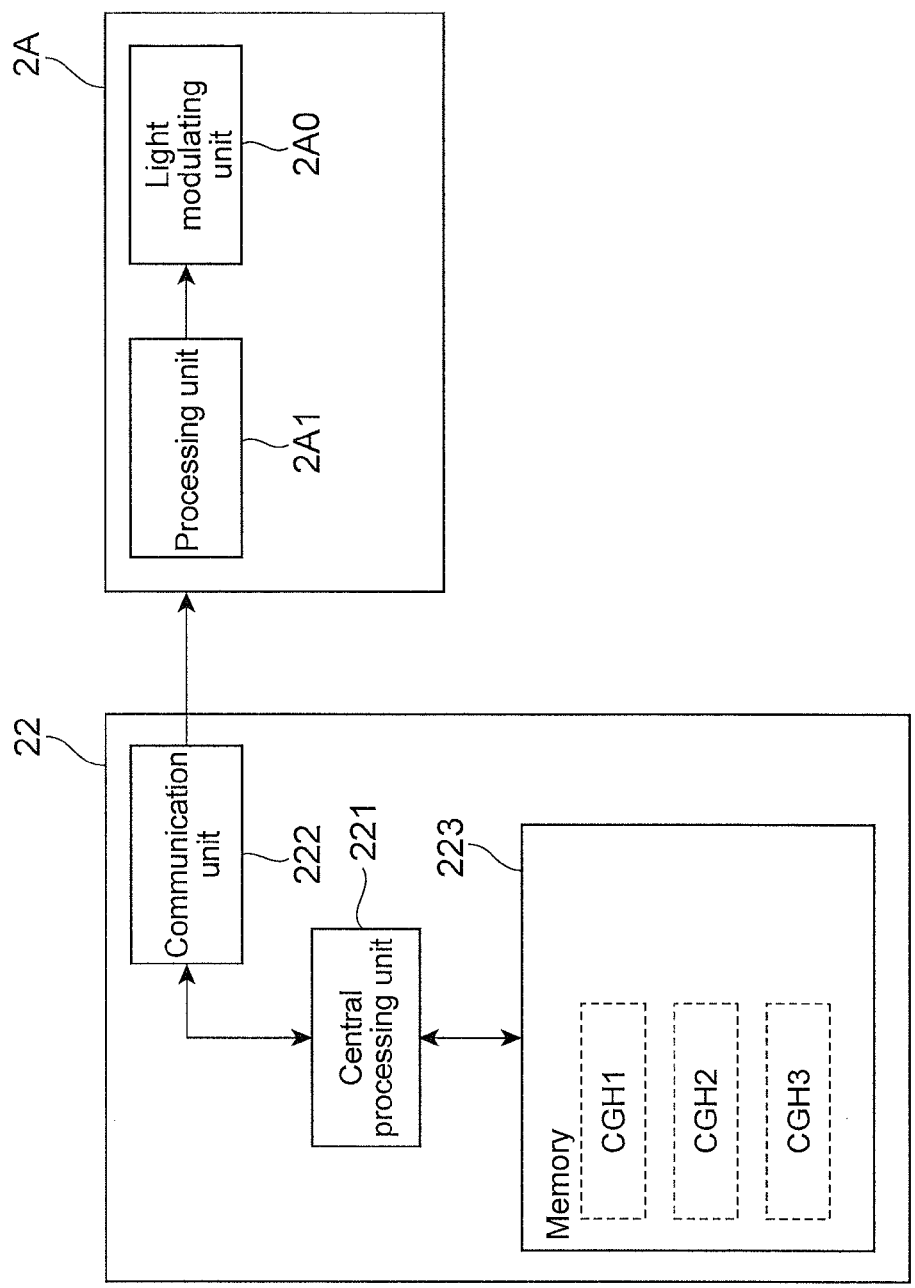
FIG. 21 is a view explaining a fourth mode of writing a hologram into the spatial light modulator 20, in the laser processing device 1 according to the first embodiment.

In a fourth mode shown in FIG. 21, a spatial light modulator and a drive section are formed of a single module 2A. A light modulating unit 2A0 corresponds here to the spatial light modulator 20. For causing the light modulating unit 2A0 to present a hologram, the control section 22 specifies hologram data stored in the memory unit 223, causes the specified hologram data to be sent to the light modulating unit 2A0, and causes the light modulating unit 2A0 to present a hologram.

Figure 22:
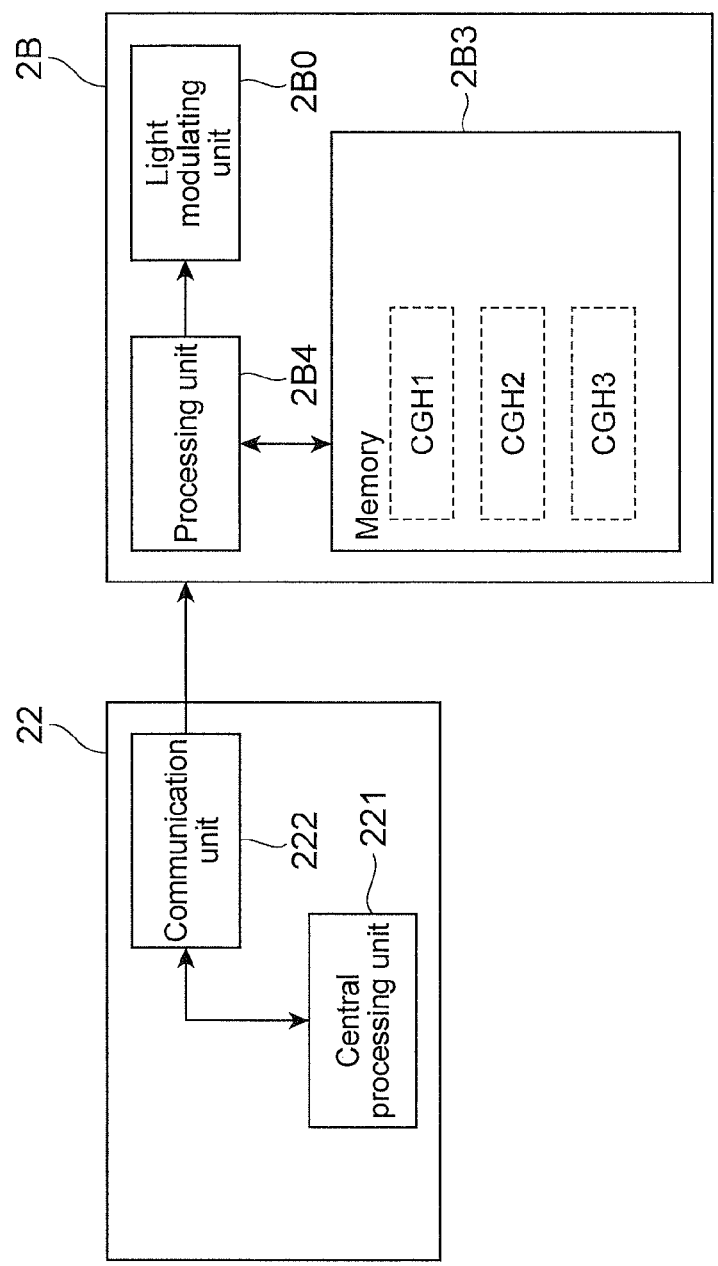
FIG. 22 is a view explaining a fifth mode of writing a hologram into the spatial light modulator 20, in the laser processing device 1 according to the first embodiment.

In a fifth mode shown in FIG. 22, a drive section and a memory are formed of a single module 2B. A memory unit 2B3 of the module 2B stores in advance data of a plurality of holograms CGH1 to CGH3 needed to cause a light modulating unit 2B0 to present in this mode. For causing the light modulating unit 2B0 to present a hologram, the control section 22 specifies, for the module 2B, hologram data stored in the memory unit 2B3, causes the specified hologram data to be sent to the light modulating unit 2B0, and causes the light modulating unit 2B0 to present a hologram.

Figure 23:
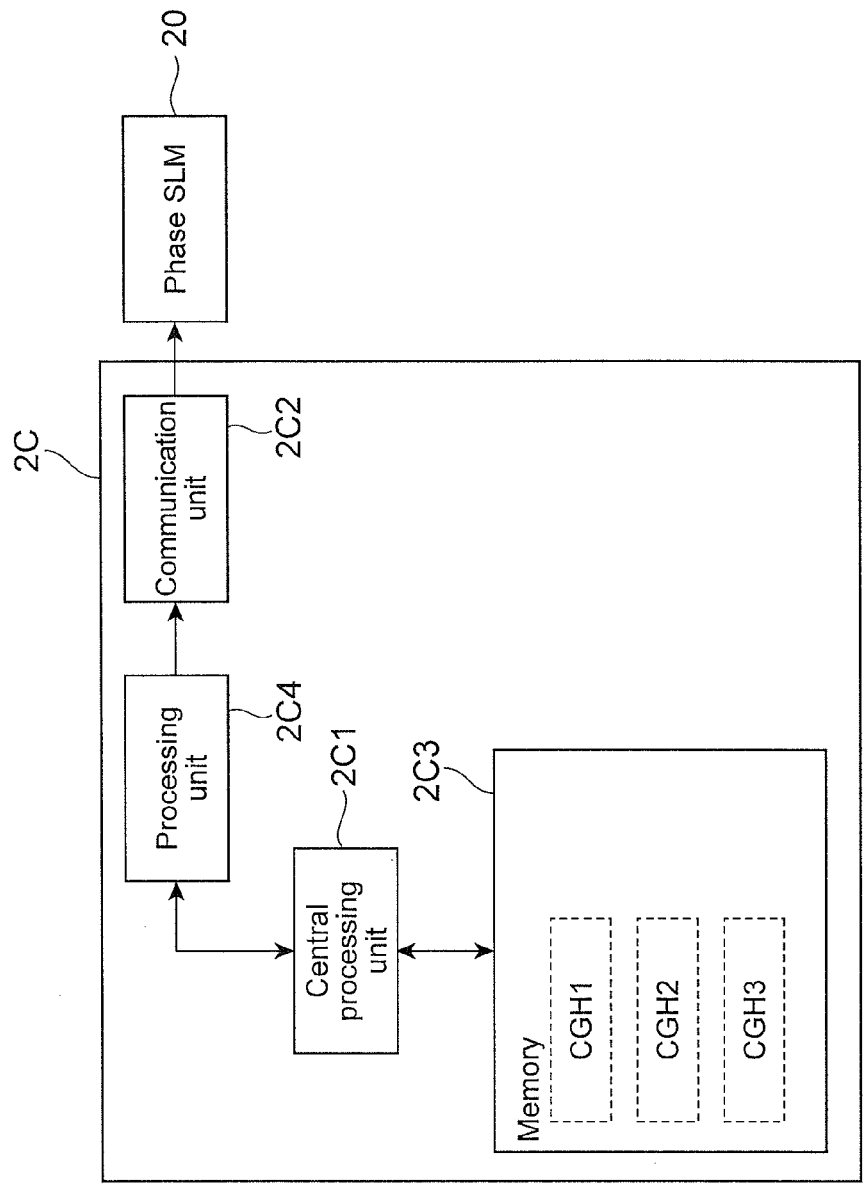
FIG. 23 is a view explaining a sixth mode of writing a hologram into the spatial light modulator 20, in the laser processing device 1 according to the first embodiment.

In a sixth mode shown in FIG. 23, a drive section and a control section are formed of a single module 2C. For causing the spatial light modulator 20 to present a hologram, the module 2C specifies hologram data stored in a memory unit 2C3, causes the specified hologram data to be sent to the spatial light modulator 20, and causes the spatial light modulator 20 to present a hologram.

Figure 24:
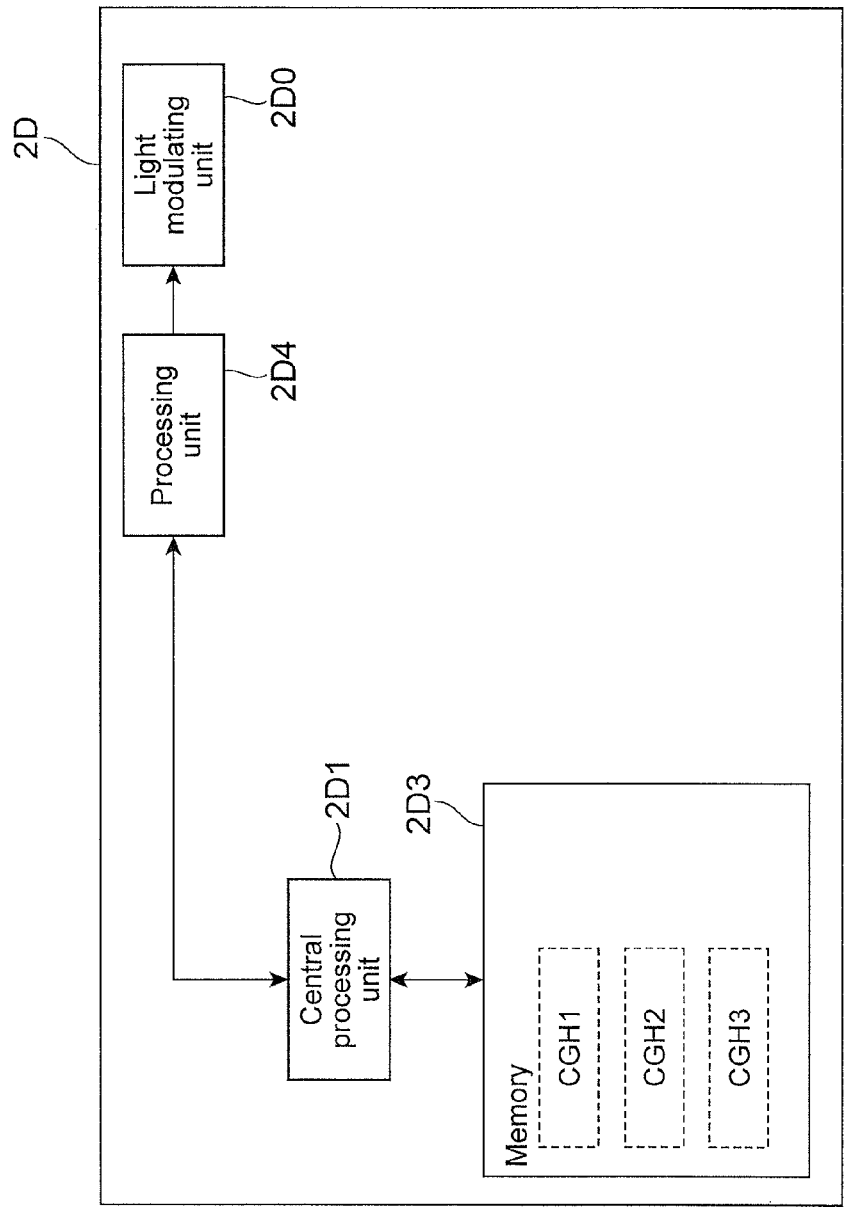
FIG. 24 is a view explaining a seventh mode of writing a hologram into the spatial light modulator 20, in the laser processing device 1 according to the first embodiment.

In a seventh mode shown in FIG. 24, a spatial light modulator, a drive section, and a control section are formed of such a module 2D that these are integrated.

Figure 25:
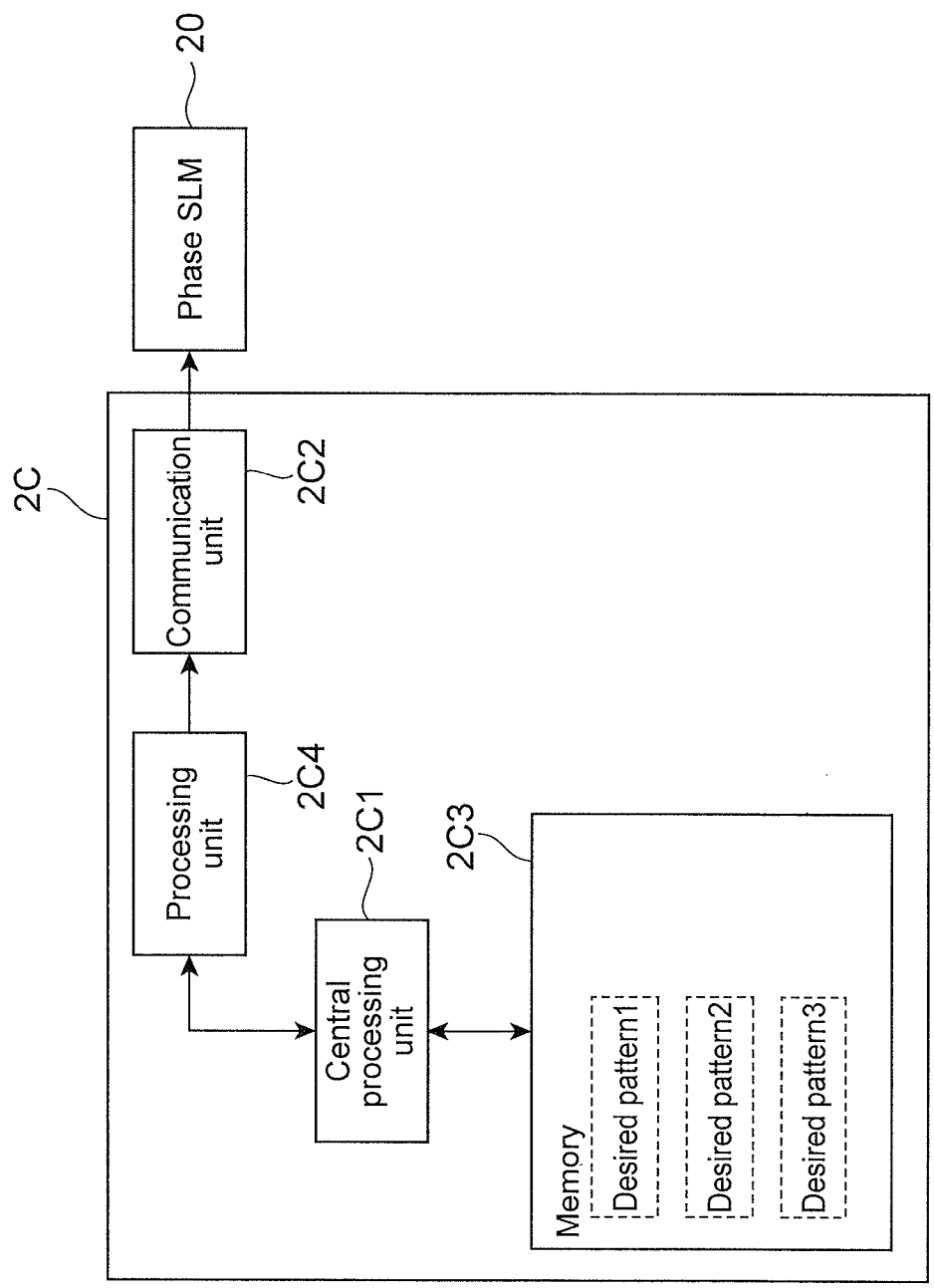
FIG. 25 is a view explaining an eighth mode of writing a hologram into the spatial light modulator 20, in the laser processing device 1 according to the first embodiment.

In an eighth mode shown in FIG. 25, the memory unit 2C3 included in the module 2C stores data of desired patterns 1 to 3 of condensing positions when laser light is condensed by the condensing optical system 30. For causing the spatial light modulator 20 to present a hologram, a central processing unit 2C1 reads desired pattern data out of the memory unit 2C3, creates a hologram that can reproduce the read-out desired pattern, and sends data of the hologram to a processing unit 2C4. The processing unit 2C4 converts the data into a signal appropriate for driving the spatial light modulator 20, and then sends the signal to a communication unit 2C2, and the communication unit 2C2 transmits the signal to the spatial light modulator 20, and causes the spatial light modulator 20 to present a hologram.

Figure 26:
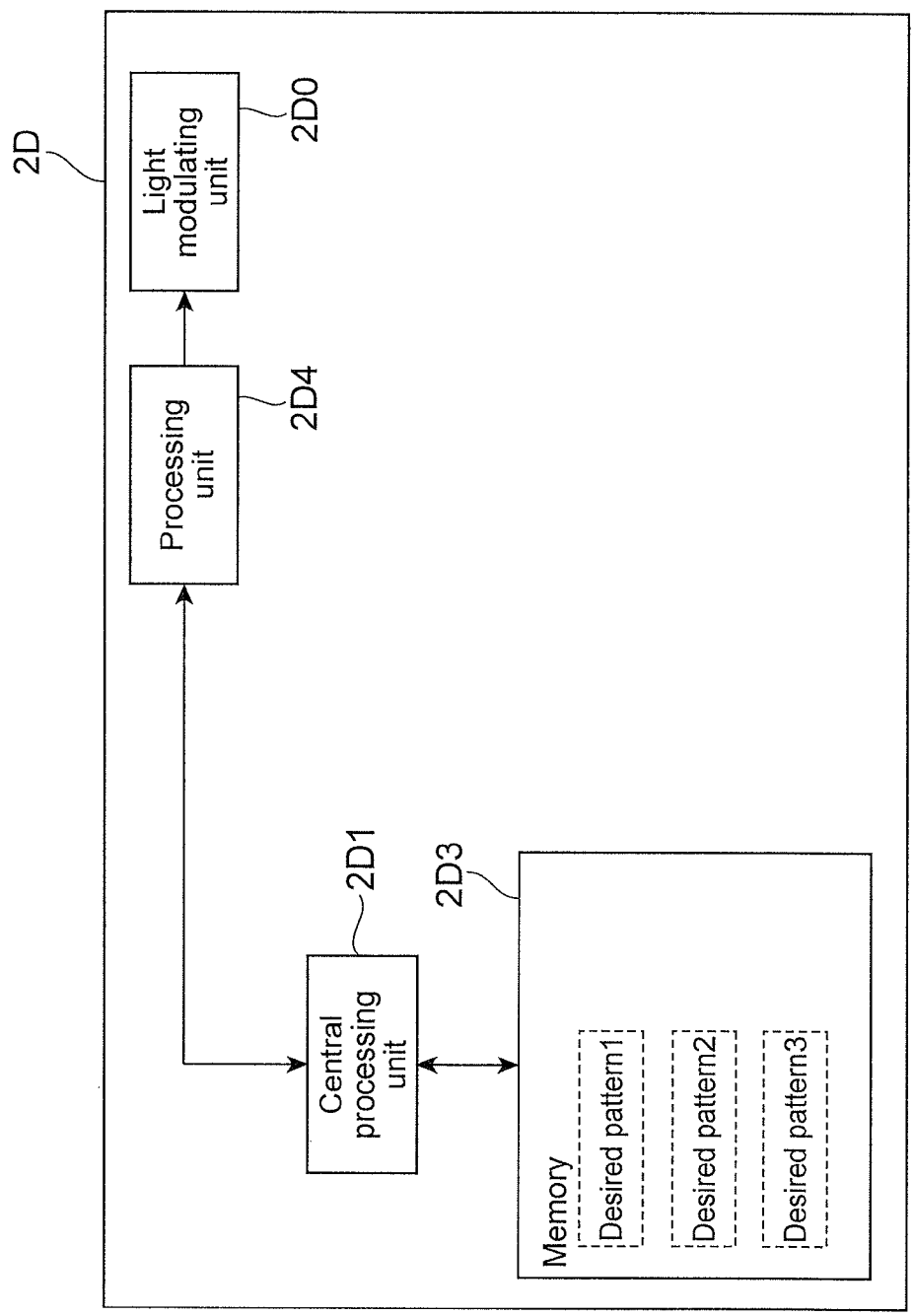
FIG. 26 is a view explaining a ninth mode of writing a hologram into the spatial light modulator 20, in the laser processing device 1 according to the first embodiment.

In a ninth mode shown in FIG. 26, a memory unit 2D3 included in the module 2D stores in advance data of desired patterns 1 to 3 of condensing positions when laser light is condensed by the condensing optical system 30. For causing a light modulating unit 2D0 to present a hologram, a central processing unit 2D1 reads desired pattern data out of the memory unit 2D3, creates a hologram that can reproduce the read-out desired pattern, and sends data of the hologram to a processing unit 2D4. The processing unit 2D4 converts the data into a signal appropriate for driving the light modulating unit 2D0, and then sends the signal to the light modulating unit 2D0, and causes the light modulating unit 2D0 to present a hologram.

In any mode shown in FIG. 2 to FIG. 4 and FIG. 21 to FIG. 26, when creating a hologram from a desired pattern of a condensing position, the hologram may be created by either method of a Fourier transform type or a Fresnel zone plate type. The Fourier transform type allows creating a hologram by algorithm such as a GS method, and the Fresnel zone plate type allows creating a hologram by algorithm such as an ORA (optimal-rotation-angle) method.

In addition, the GS method has been described in a literature "R. W. Gerchberg and W. O. Saxton, 'A practical algorithm for the determination of phase from image and diffraction plane pictures', Optik, Vol. 35, pp. 237-246 (1972)." Moreover, the ORA method has been described in a literature "Jorgen Bengtsson, 'Kinoform design with an optimal-rotation-angle method', Applied Optics, Vol. 33, No. 29, pp. 6879-6884 (1994)."

Figure 27:
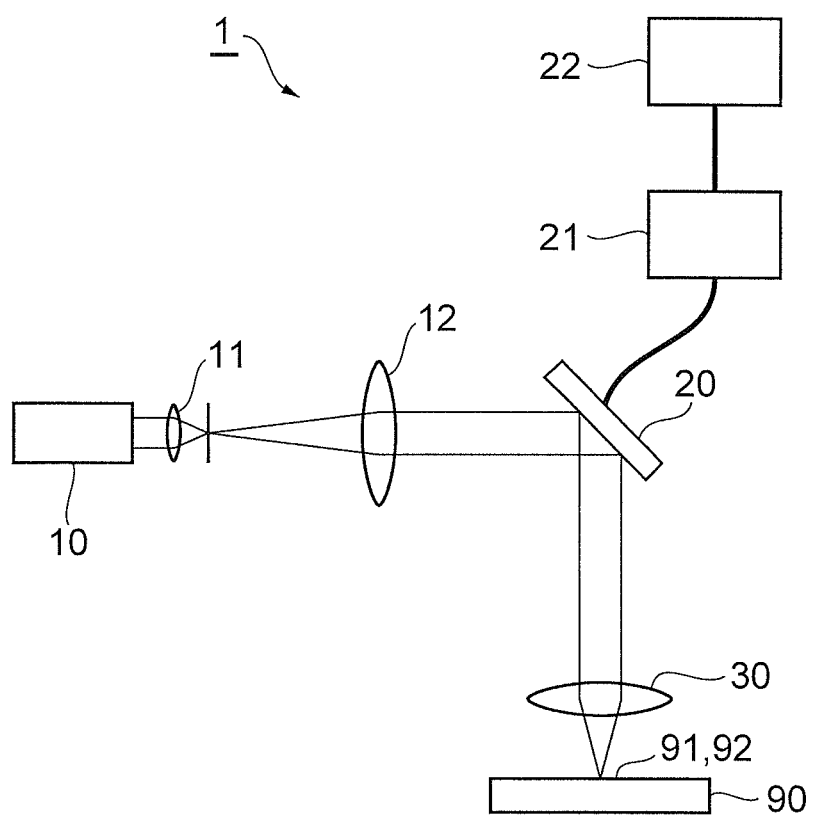
FIG. 27 is a view showing another configuration of the laser processing device 1 according to the first embodiment.
Figure 28:
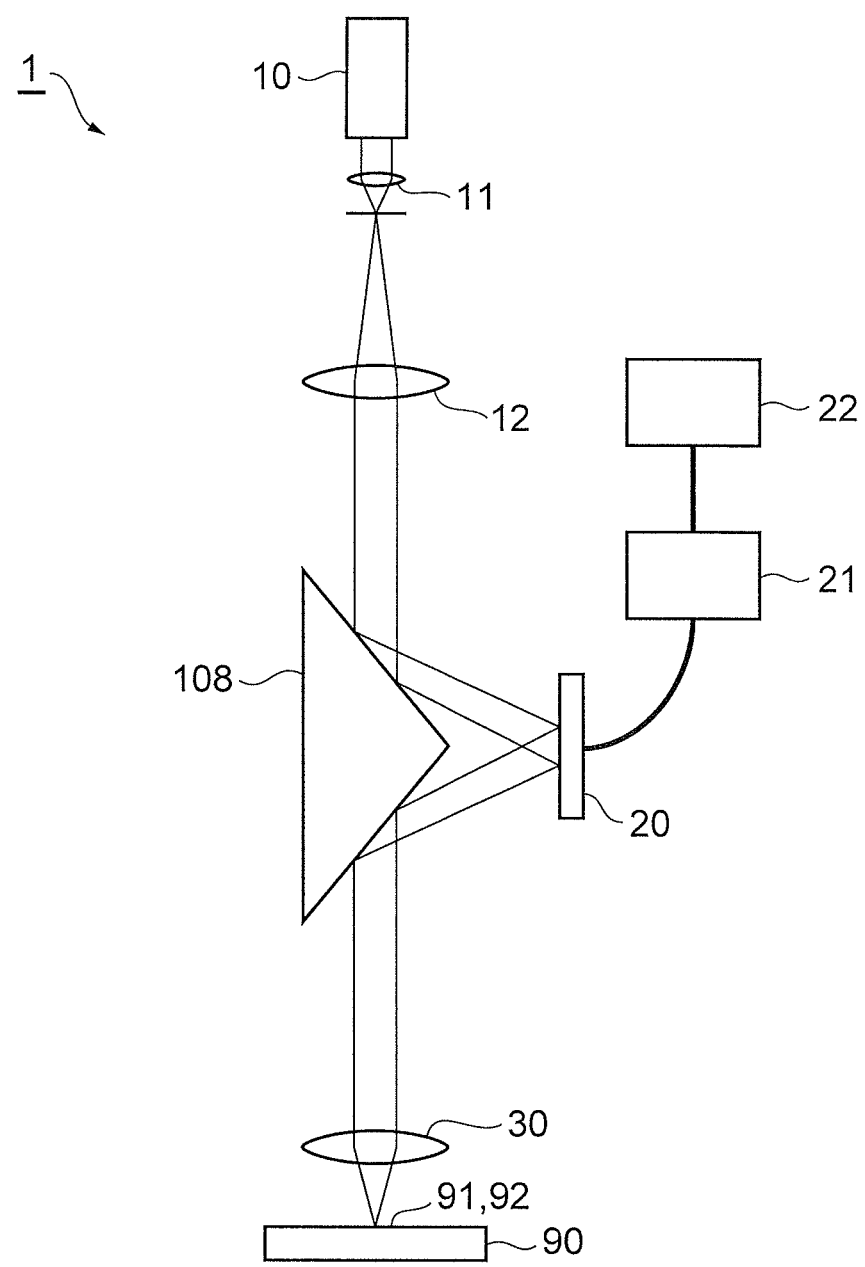
FIG. 28 is a view showing another configuration of the laser processing device 1 according to the first embodiment.

Moreover, several modes can be considered as the configuration of a laser processing device according to the first embodiment. For example, one without mirrors 13, 14 can be considered as shown in FIG. 27. Moreover, such an optical system using a prism 108 as shown in FIG. 28 where an incident light and an emission light coaxially exist can also be considered.

Figure 29:
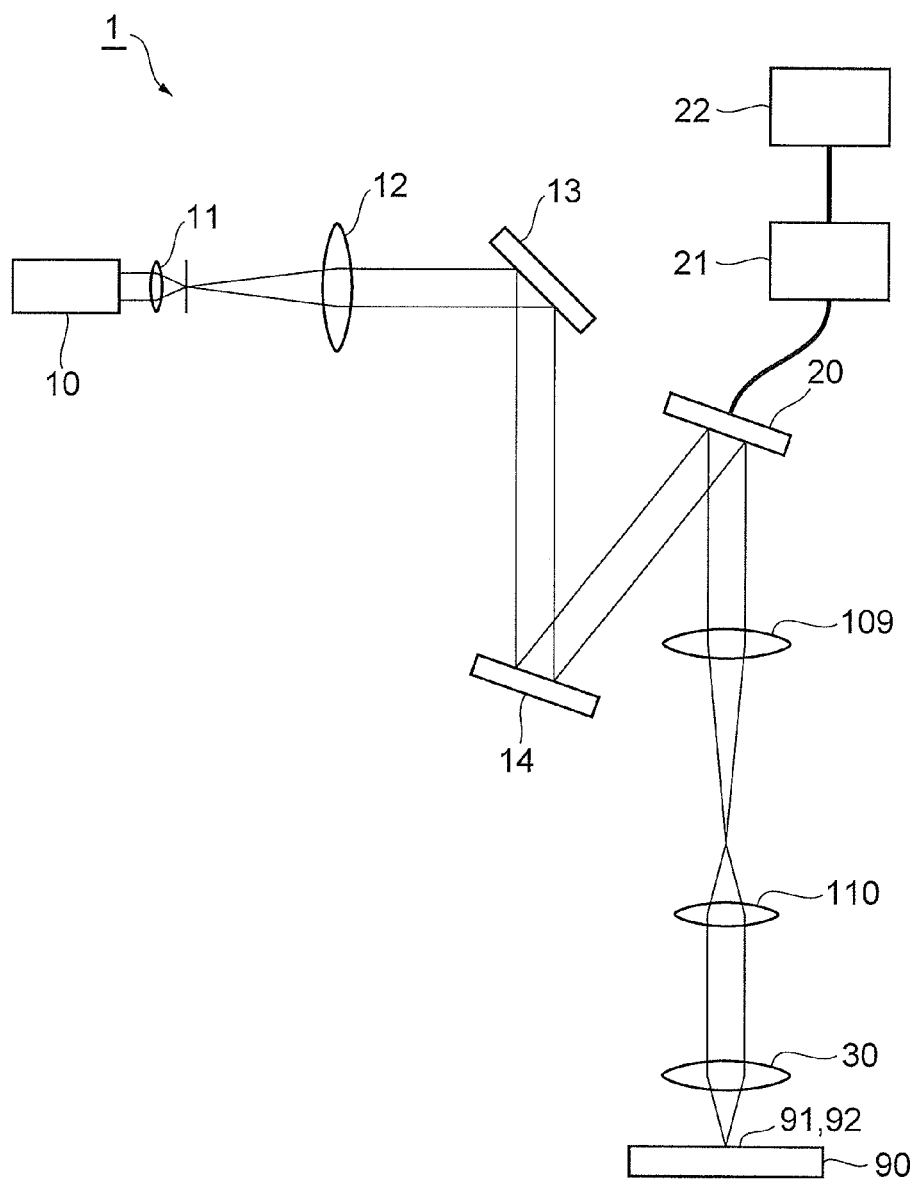
FIG. 29 is a view showing another configuration of the laser processing device 1 according to the first embodiment.

Further, FIG. 29 shows an optical system where relay lenses 109, 110 are disposed between the spatial light modulator 20 and the condensing optical system 30 of FIG. 1. By disposing the relay lenses, information on the phase or the like modulated by the spatial light modulator 20 is propagated to the condensing optical system 30 with no influence of Fresnel diffraction. Moreover, these relay lenses can be applied also to the processing devices of FIG. 27 and FIG. 28.

Figure 30:
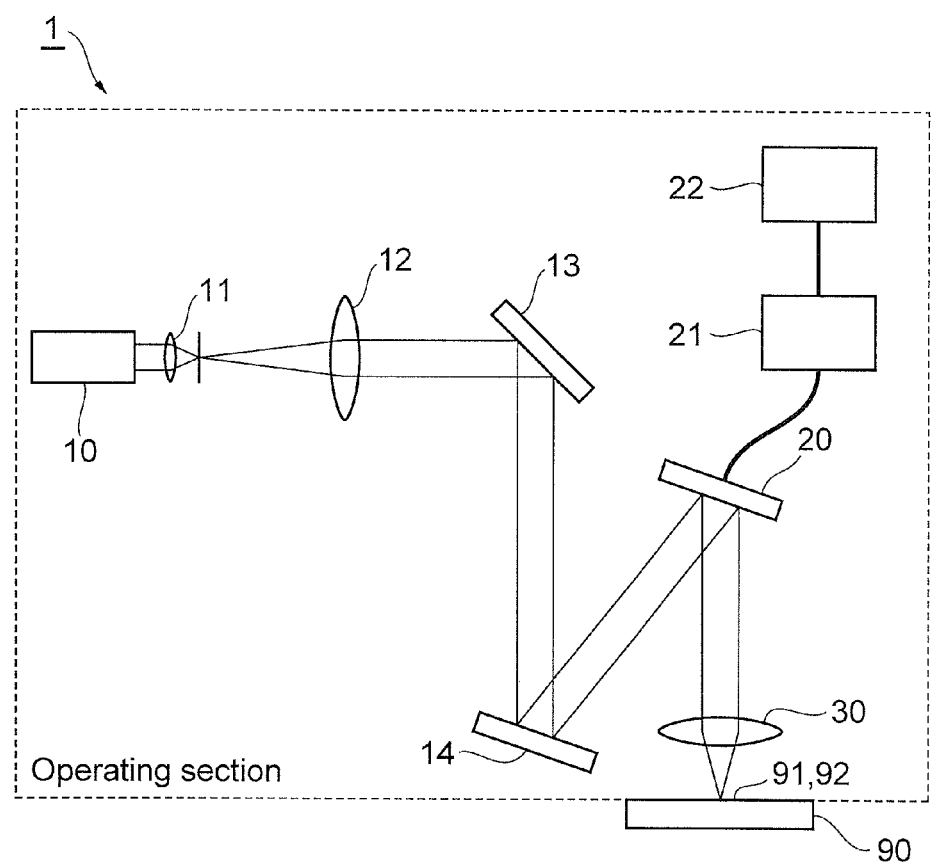
FIG. 30 is a view showing another configuration of the laser processing device 1 according to the first embodiment.
Figure 31:
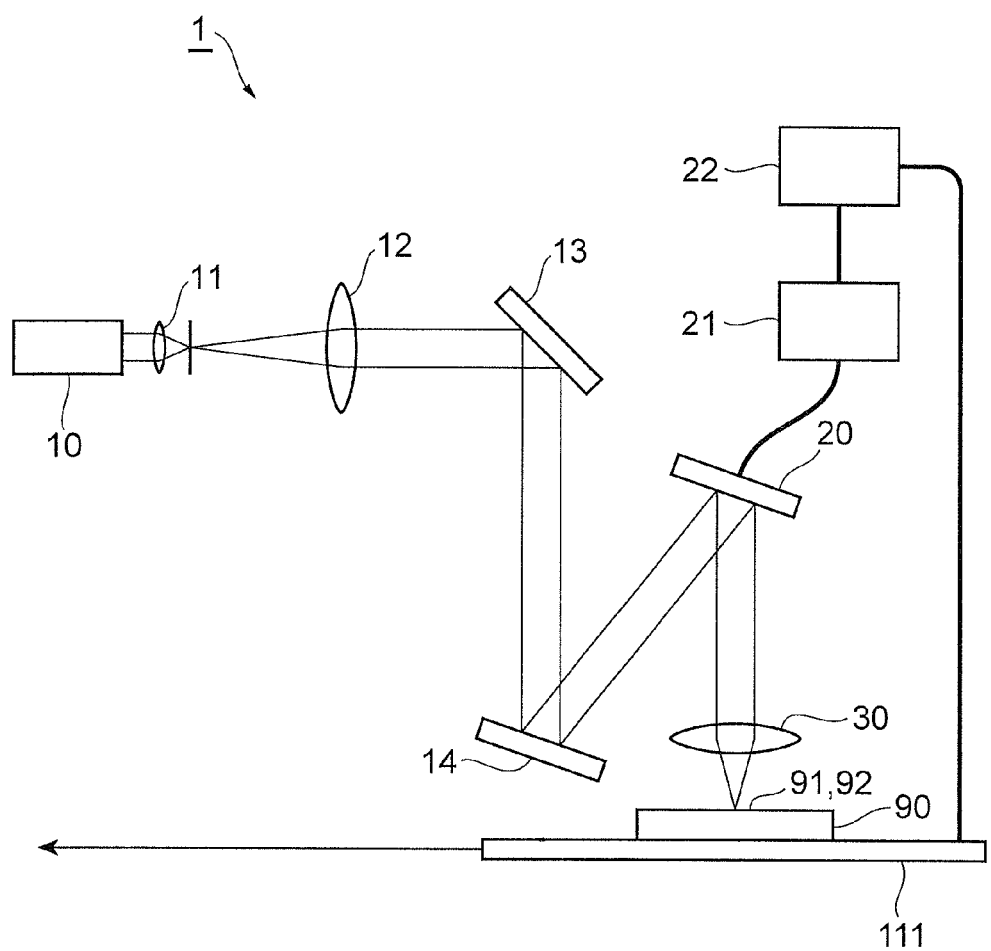
FIG. 31 is a view showing another configuration of the laser processing device 1 according to the first embodiment.

In the laser processing device 1 according to the first embodiment, it is preferable that the optical system is configured for processing as an operating section to move as shown in FIG. 30, or that the processing object 90 moves along with movement of a platform 111 as shown in FIG. 31.

[Laser Processing Method]

Next, operation of the laser processing device 1 according to the first embodiment and a laser processing method according to the first embodiment will be compared with a comparative example, while being described. Here, laser light is condensed and irradiated to the processing object 90 so as to carry out a multi-point display of three alphabetical characters of "H," "P," and "K" to process the processing object 90.

[Laser Processing Method, Comparative Example]

Figure 5:
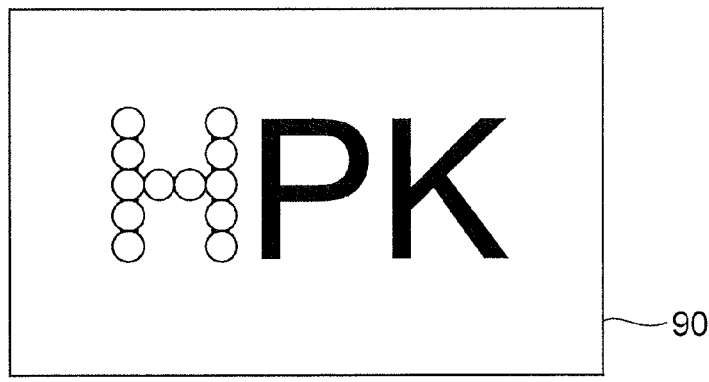
FIG. 5 are views explaining a laser processing method of a comparative example in the explanation of the first embodiment.
Figure 5:
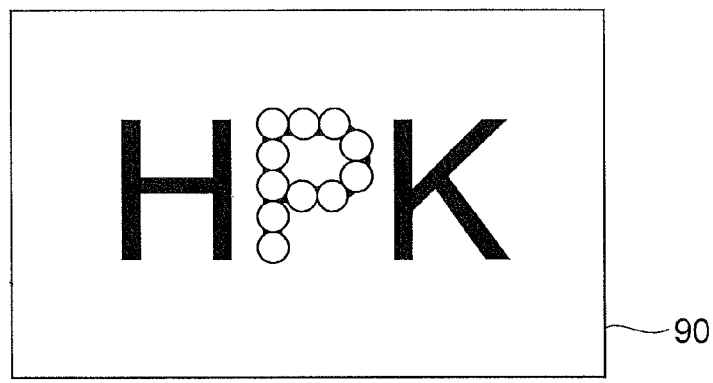
Figure 5:
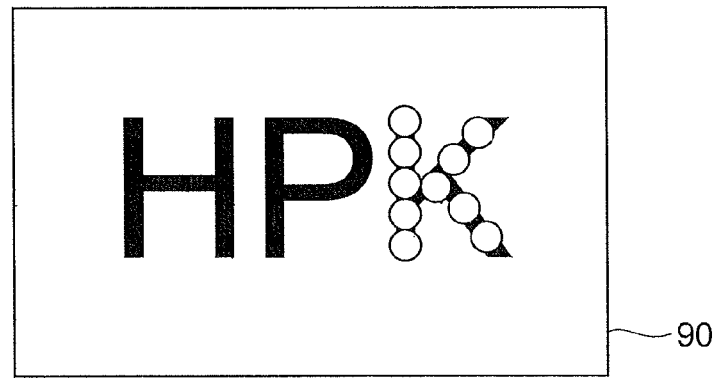

FIG. 5 are views explaining a laser processing method of a comparative example. The circles show laser light condensing positions in each of FIG. 5(a) to FIG. 5(c). FIG. 5(a) shows a state of laser light being irradiated to 12 points of condensing positions in order to process the character "H." FIG. 5(b) shows a state of laser light being irradiated to 11 points of condensing positions in order to process the character "P." Moreover, FIG. 5(c) shows a state of laser light being irradiated to 10 points of condensing positions in order to process the character "K."

In this comparative example, a hologram such as to allow processing the character of "H" is first presented on the spatial light modulator, a hologram such as to allow processing the character of "P" is then presented on the spatial light modulator, and a hologram such as to allow processing the character of "K" is lastly presented on the spatial light modulator. Thus, in the case of processing the characters one by one in the order of "H," "P," and "K," since the number of laser light condensing positions is different depending on the character, the laser light irradiation energy of the respective condensing positions is different depending on the character, and therefore, processing unevenness occurs depending on the character.

In addition, for easier understanding, if a total energy of a laser light to be irradiated to the processing object 90 is, for example, 12.0 GW/cm², in FIG. 5(a), a laser light having an energy of 1.0 GW/cm² (here, 12.0/12=1.0) is to be condensed to each of the 12 points of condensing positions. On the other hand, in FIG. 5(b), a laser light having an energy of 1.0909 GW/cm² (here, 12.0/11=1.0909) is to be condensed to each of the 11 points of condensing positions, and in FIG. 5(c), a laser light having an energy of 1.2 GW/cm² (here, 12.0/10=1.2) is to be condensed to each of the 10 points of condensing positions. Thus, in the comparative example, the laser light irradiation energy of the respective condensing positions is different depending on the character, and therefore, processing unevenness occurs depending on the character.

On the other hand, in the present embodiment, when a phase-modulated laser light output from the spatial light modulator 20 where a plurality of holograms have been respectively presented is input to the condensing optical system 30, at a condensing position existing in the processing region 91 (refer to FIG. 6 etc.) out of a plurality of condensing positions in the processing object 90, a part of the phase-modulated laser light is condensed as a laser light ("contribution light" as to be described later) having a constant energy not less than a predetermined threshold X. On the other hand, at a condensing position existing in the region 92 (refer to FIG. 6 etc.) other than the processing region 91 out of the condensing positions in the processing object 90, a remaining part of the phase-modulated laser light is dispersed and condensed as a plurality of laser lights ("non-contribution lights" as to be described later) having a weak energy less than the threshold X to thereby process the processing object 90. In the following, the laser processing method in the present embodiment will be described in detail.

[Laser Processing Method, First Mode]

Figure 6:
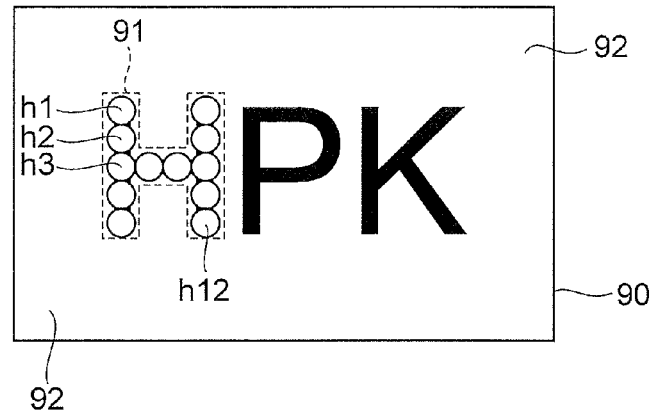
FIG. 6 are views explaining a first mode of a laser processing method according to the first embodiment.
Figure 6:
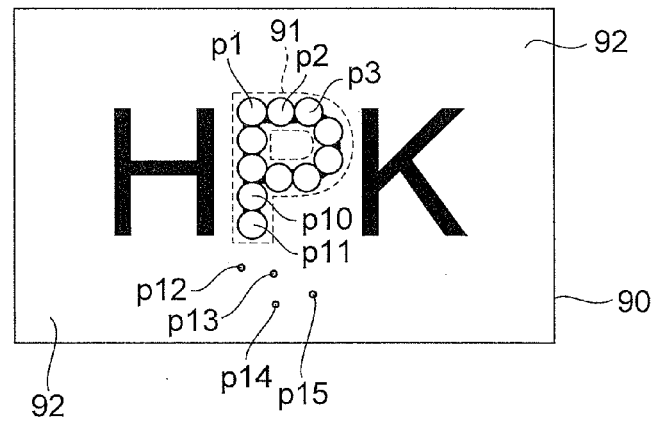
Figure 6:
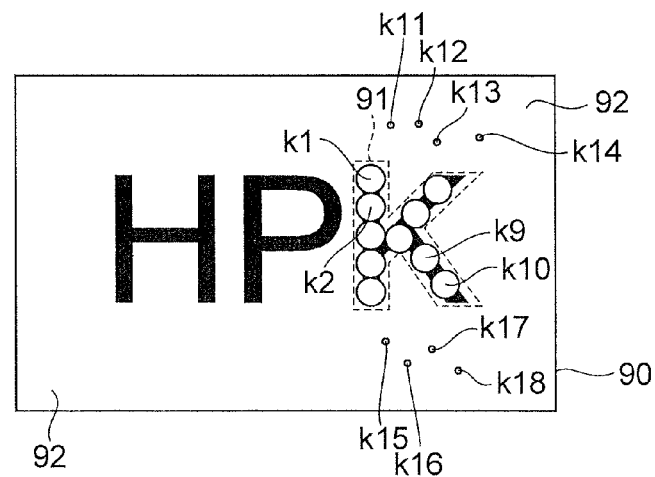

FIG. 6 are views explaining a first mode of the laser processing method according to the first embodiment. FIG. 6(a) shows a state of laser light being, in order to process the character "H," irradiated to 12 points of condensing positions h1 to h12 within the processing region 91. The 12 points of condensing positions h1 to h12 shown in FIG. 6(a) all exist within the processing region 91, and at the respective condensing positions, a phase-modulated laser light (hereinafter, referred to as "an incident light") output from the spatial light modulator 20 is condensed as a laser light having a constant energy not less than a predetermined threshold X. Here, the predetermined threshold X, which is a value indicating the energy of laser light to start processing of the processing region 91, is, for example, 0.9 GW/cm² in the present embodiment although this depends on the material and the like of the processing object 90. Since the laser light having an energy not less than the threshold X is condensed to the condensing positions h1 to h12 existing in the processing region 91, the processing region 91 is processed with a pattern of the character "H" after condensing and irradiation of the laser light. Also, in the present specification, a laser light that has an energy not less than a predetermined threshold X and contributes to processing of a part of the processing region 91 to which the laser light has been condensed and irradiated after the condensing and irradiation is referred to as a "contribution light." That is, the laser light to be irradiated to the condensing positions h1 to h12 is a contribution light.

Moreover, the "processing region 91" is a region on an outer surface of the processing object 90 or a region inside thereof, and in, for example, FIG. 6(a), is a region that needs to be laser-processed in order to process the character "H" in the processing object 90. In the drawing, the processing region 91 is displayed with dotted lines. Moreover, the "region 92 other than the processing region 91" is a region on an outer surface of the processing object 90 or a region inside thereof, and is a region excluding the processing region 91 of the entire region of the processing object 90. In the following, the region 92 other than the processing region 91 will be described as a "non-processing region 92."

In addition, for easier understanding, if a total energy of an incident light is, for example, 12.0 GW/cm², in FIG. 6(a), the incident light is entirely condensed to the processing region 91, and a laser light having an energy of 1 GW/cm² (here, 12.0/12=1.0) is condensed to each of the condensing positions h1 to h12 existing in the processing region 91.

FIG. 6(b) shows a state of laser light being, in order to process the character "P," irradiated to 11 points of condensing positions p1 to p11 within the processing region 91, and irradiated to four points of condensing positions p12 to p15 within the non-processing region 92. At the 11 points of condensing positions p1 to p11 existing in the processing region 91, a part of the incident light is condensed as a contribution light having a constant energy not less than a predetermined threshold X. Since the laser light having an energy not less than the threshold X is condensed to the condensing positions p1 to p11 existing in the processing region 91, a part of the processing region 91 to which the laser light has been condensed and irradiated is processed with a pattern of the character "P" after the condensing and irradiation of the laser light. On the other hand, at the four points of condensing positions p12 to p15 existing in the non-processing region 92, a remaining part of the incident light (that is, the incident light from which the part of laser light condensed to the condensing positions p1 to p11 has been excluded, which is a laser light unnecessary at the processing surface of the processing object 90, hereinafter, an "unnecessary light") is dispersed and condensed as a plurality of laser lights having a weak energy less than the predetermined threshold X.

Also, in the present specification, a laser light that has an energy less than a predetermined threshold X and does not contribute to processing of a part to which the laser light has been condensed and irradiated after the condensing and irradiation is referred to as a "non-contribution light." That is, the laser light to be irradiated to the condensing positions p12 to p15 is a non-contribution light. Since the non-contribution light having a weak energy less than the threshold X is condensed to the condensing positions p12 to p15 existing in the non-processing region 92, the non-processing region 92 is not processed even after condensing and irradiation of the non-contribution light. Also, in the drawings regarding the first embodiment, for convenience of description, a difference in the energy of laser light is expressed proportional to the size of the white circles. Such CGHs different in energy can be created in, for example, the GS method, by differentiating the amplitude of target patterns.

In the above-described example where a total energy of an incident light is assumed as, for example, 12 GW/cm², a part of the incident light is condensed to the processing region 91, and the rest is dispersed and condensed as a plurality of laser lights having a weak energy to the non-processing region 92 in FIG. 6(b). More specifically, a laser light having the same energy (that is, 1.0 GW/cm²) as that in the case of FIG. 6(a) is condensed to each of the condensing positions p1 to p11 existing in the processing region 91. Then, a remaining laser light, more specifically, a laser light of 1 GW/cm² excluding, of 12 GW/cm² being a total energy of the incident light, 11 GW/cm² irradiated to the condensing positions p1 to p11 is dispersed every 0.25 GW/cm² (here, 1.0/4=0.250) and condensed to the four points of condensing positions p12 to p15 of the non-processing region 92. That is, as compared to FIG. 6(a), the condensing positions of laser light existing in the processing region 91 are short by one in FIG. 6(b), but a laser light of an energy (1.0 GW/cm²) corresponding thereto is dispersed and condensed as a plurality (four points) of weak laser lights having an energy (0.250 GW/cm²) not more than the threshold X in the non-processing region 92.

FIG. 6(c) shows a state of laser light being, in order to process the character "K," irradiated to 10 points of condensing positions k1 to k10 within the processing region 91, and irradiated to eight points of condensing positions k11 to k18 within the non-processing region 92. At the 10 points of condensing positions k1 to k10 existing in the processing region 91, a part of the incident light is condensed as a contribution light having a constant energy not less than a predetermined threshold X. Since the laser light having an energy not less than the threshold X is condensed, a part of the processing region 91 to which the laser light has been condensed and irradiated is processed with a pattern of the character "K" after the condensing and irradiation of the laser light. On the other hand, at the eight points of condensing positions k11 to k18 existing in the non-processing region 92, a remaining part of the incident light (that is, the incident light from which the part of laser light condensed to the condensing positions k1 to k10 has been excluded, an unnecessary light) is dispersed and condensed as a plurality of non-contribution lights having a weak energy less than the predetermined threshold X. Since the laser light having an energy less than the threshold X is condensed to the condensing positions k11 to k18 existing in the non-condensing region 92, the non-condensing region 92 is not processed even after condensing and irradiation of the laser light.

In the above-described example where a total energy of an incident light is assumed as, for example, 12 GW/cm², a part of the incident light is condensed to the processing region 91, and the rest is dispersed and condensed as a plurality of laser lights having a weak energy to the non-processing region 92 in FIG. 6(c). More specifically, a laser light having the same energy (that is, 1.0 GW/cm²) as that in the case of FIG. 6(a) is condensed to each of the condensing positions k1 to k10 existing in the processing region 91. Then, a remaining laser light, more specifically, a laser light of 2 GW/cm² excluding, of 12 GW/cm² being a total energy of the incident light, 10 GW/cm² irradiated to the condensing positions k1 to k10 is dispersed every 0.250 GW/cm² (here, 2.0/8=0.250) and condensed to the eight points of condensing positions k11 to k18 of the non-processing region 92. That is, as compared to FIG. 6(a), the condensing positions of laser light existing in the processing region 91 are short by two in FIG. 6(c), but a laser light of an energy (2.0 GW/cm²) corresponding thereto is dispersed and condensed as a plurality (eight points) of weak laser lights having an energy (0.250 GW/cm²) not more than the threshold X in the non-processing region 92.

In the first mode described above, a laser light output from the spatial light modulator 20 where holograms corresponding to "H," "P," and "K," respectively, have been sequentially presented is, by the condensing optical system 30, condensed to the condensing positions (h1 to h12, p1 to p11, k1 to k10) existing in the processing region 91 as a contribution light having a constant energy not less than a predetermined threshold X, while at the condensing positions (p12 to p15, k11 to k18) existing in the non-processing region 92, dispersed and condensed as a plurality of non-contribution lights having an energy less than the threshold X.

Thus, even in the case of processing the characters one by one in the order of "H," "P," and "K," irrespective of the character, by treating an unnecessary light as a non-contribution light having an energy less than a predetermined threshold X so as not to contribute to processing, even when the number of condensing positions in the processing region varies, the energy of a contribution light can be maintained constant, and therefore, processing unevenness can be suppressed irrespective of the character.

[Laser Processing Method, Second Mode]

Figure 7:
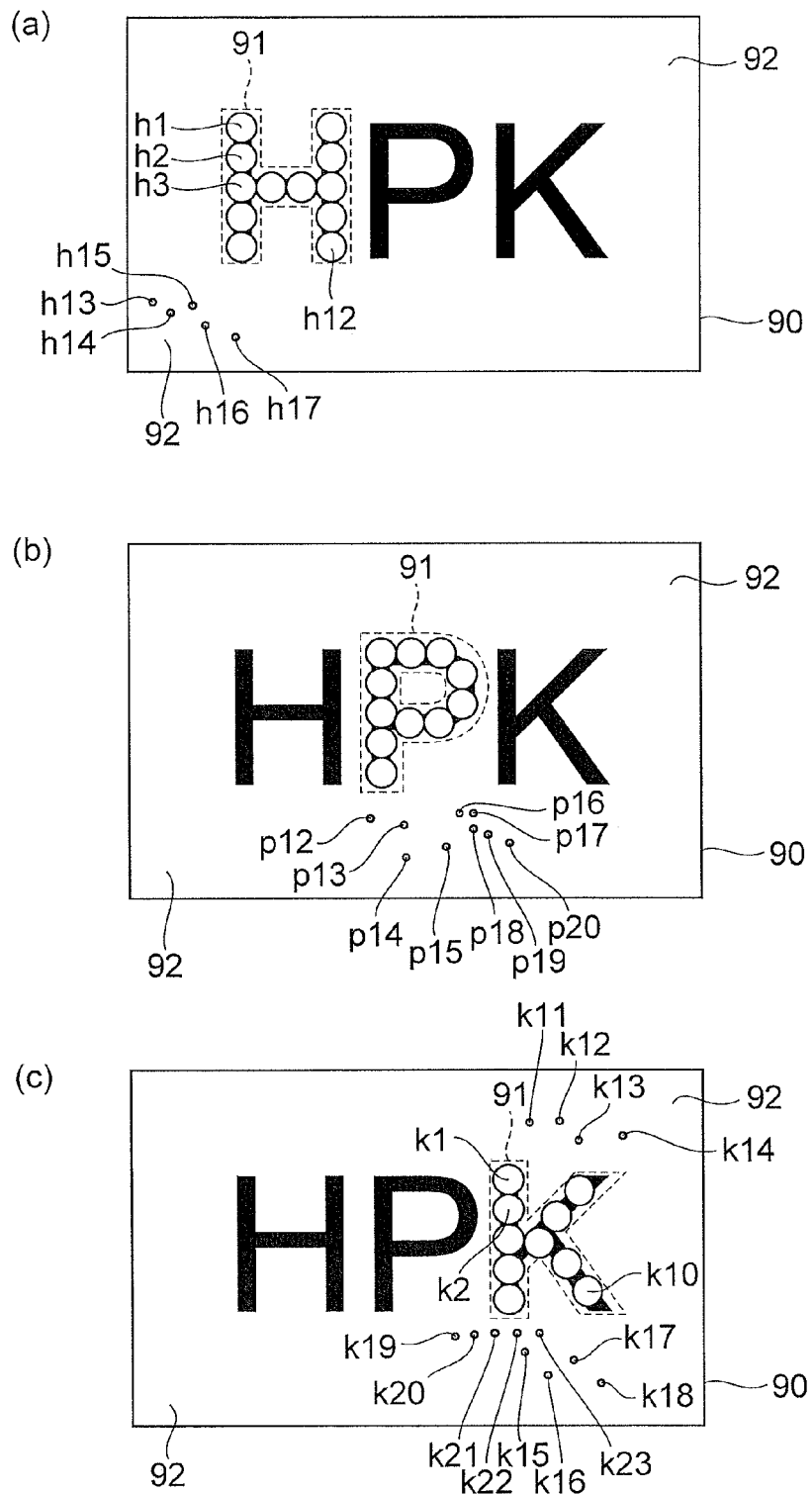
FIG. 7 are views explaining a second mode of a laser processing method according to the first embodiment.

FIG. 7 are views explaining a second mode of the laser processing method according to the first embodiment. FIG. 7(a) shows a state of laser light being, in order to process the character "H," irradiated to 12 points of condensing positions h1 to h12 within the processing region 91, and irradiated to five points of condensing positions h13 to h17 within the non-processing region 92. As compared to FIG. 6(a) in the above first mode, there is a difference in that laser light is irradiated also to the five points of condensing positions h13 to h17 within the non-processing region 92. FIG. 7(b) shows a state of laser light being, in order to process the character "P," irradiated to 11 points of condensing positions p1 to p11 within the processing region 91, and irradiated to nine points of condensing positions p12 to p20 within the non-processing region 92. As compared to FIG. 6(b) in the above first mode, there is a difference in that laser light is irradiated not only to four condensing positions p12 to p15 within the non-processing region 92, but also to five points of condensing positions p16 to p20. FIG. 7(c) shows a state of laser light being, in order to process the character "K," irradiated to 10 points of condensing positions k1 to k10 within the processing region 91, and irradiated to 13 points of condensing positions k11 to k23 within the non-processing region 92. As compared to FIG. 6(c) in the above first mode, there is a difference in that laser light is irradiated not only to eight condensing positions k11 to k18 within the non-processing region 92, but also to five points of condensing positions k19 to k23.

More specifically, also in this second mode described above, a laser light output from the spatial light modulator 20 where holograms corresponding to "H," "P," and "K," respectively, have been sequentially presented is, by the condensing optical system 30, in a part of the incident light, condensed as a contribution light having a constant energy not less than a predetermined threshold X at the condensing positions (h1 to h12, p1 to p11, k1 to k10) existing in the processing region 91, while dispersed and condensed as a plurality of non-contribution lights having an energy less than the threshold X at the condensing positions (h13 to h17, p12 to p20, k11 to k23) existing in the non-processing region 92.

However, in the first mode, the character "H" (a "predetermined processing region" in the claims) requires the greatest energy for processing, and a laser light having the same energy (for example, 1.2 GW/cm²) as that required for processing of the character "H" is made incident. Then, in FIG. 6(a), the incident laser light is entirely condensed as a contribution light having a constant energy not less than the threshold X to the condensing positions h1 to h12 existing in the processing region 91, and no unnecessary light exists.

On the other hand, the second mode is a case where a laser light having an energy (for example, 13 GW/cm²) greater than the energy (for example, 12 GW/cm²) required for processing of the character "H" is made incident. Then, in FIG. 7(a), of, for example, 13 GW/cm² being a total energy of the incident light, a part (for example, 12 GW/cm²) for processing the character "H" is caused to be condensed as a contribution light having a constant energy not less than the threshold X on the condensing positions h1 to h12 existing in the processing region 91, respectively. Then, a remaining laser light, more specifically, a laser light of 1 GW/cm² excluding, of the incident light of, for example, 13 GW/cm², 12 GW/cm² condensed as a contribution light is, as a non-contribution light having an energy less than the threshold X, caused to be dispersed every 0.20 GW/cm² (here, 1.0/5=0.20) and condensed to the five points of condensing positions h13 to h17 of the non-processing region 92.

That is, as compared to FIG. 6(a), in FIG. 7(a), the remaining laser light of the incident light after processing the character "H" that requires the greatest energy for processing is dispersed and condensed as a plurality of weak laser lights having an energy less than the threshold X in the non-processing region 92. In addition, such adjustment in the energy of laser light as in the above can be carried out by the control section 22 causing the spatial light modulator 20 to present an appropriate hologram.

The second mode described above, when the energy of an incident light is great, allows appropriately setting the size of a laser light irradiation energy at the respective condensing positions existing in the processing region 91, and is thus preferable. When the energy of an incident light is great, by increasing the number of condensing positions (for example, h13 to h17) existing in the non-processing region 92, the size of a laser light irradiation energy at the respective condensing positions existing in the processing region 91 can be appropriately maintained. In addition, such adjustment can be realized by the setting method and use of a hologram.

Moreover, in either the first mode or the second mode, when processing the respective characters "H," "P," and "K," irrespective of the character, by treating an unnecessary light as a non-contribution light having an energy less than a predetermined threshold X so as not to contribute to processing, even when the number of condensing positions in the processing region varies, the energy of a contribution light can be maintained constant, and therefore, processing unevenness can be suppressed irrespective of the character.

[Laser Processing Method, Third Mode]

Figure 8:
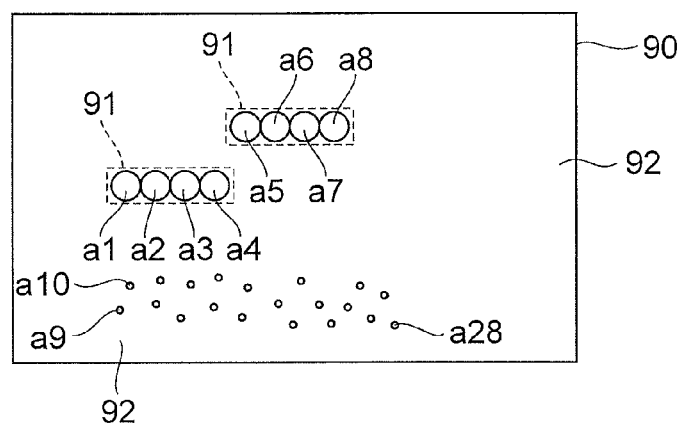
FIG. 8 are views explaining a third mode of a laser processing method according to the first embodiment.
Figure 8:
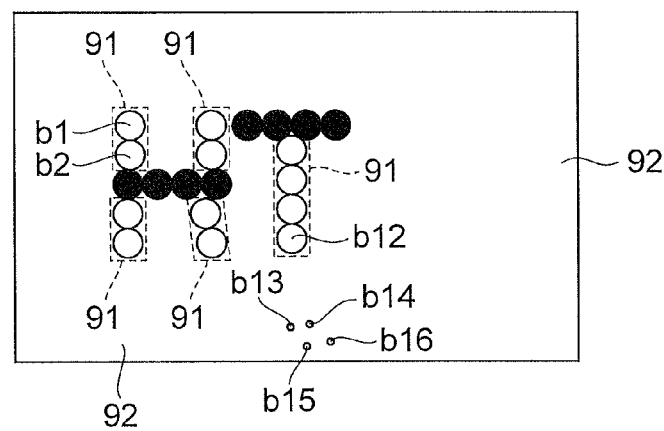
Figure 8:
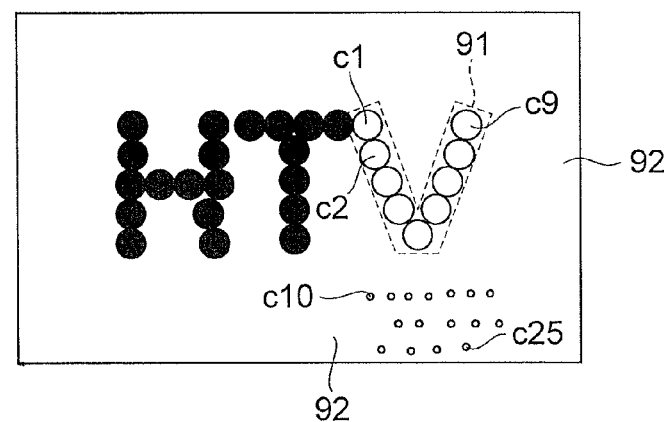

FIG. 8 are views explaining a third mode of the laser processing method according to the first embodiment. In each of FIG. 8(a) to FIG. 8(c), the white circles indicate laser light condensing positions, and the black circles indicate already processed positions. Here, laser light is condensed and irradiated to the processing region 91 and the non-processing region 92 of the processing object 90 so as to carry out a multi-point display of three alphabetical characters of "H," "T," and "V" to process the processing object 90. However, the characters are not processed one by one in the order of "H," "T," and "V," but a part of each of the characters "H" and "T" is first processed, the remaining part of each of the characters "H" and "T" is then processed, and the entire character of "V" is lastly processed.

FIG. 8(a) shows a state of a laser light output from the spatial light modulator 20 where three holograms have been sequentially presented being, by the condensing optical system 30, irradiated to eight points of condensing positions a1 to a8 within the processing region 91, and irradiated to 20 points of condensing positions a9 to a28 within the non-processing region 92. At the eight points of condensing positions a1 to a8 existing in the processing region 91, a part of the incident light is condensed as a contribution light having a constant energy not less than a predetermined threshold X. Since the laser light having an energy not less than the threshold X is condensed, a part of the processing region 91 to which the laser light has been condensed and irradiated is processed with a pattern of horizontal bars of the character "H" and character "T" after the condensing and irradiation of the laser light. On the other hand, at the 20 points of condensing positions a9 to a28 existing in the non-processing region 92, a remaining part of the incident light (that is, the incident light from which the part of laser light condensed to the condensing positions a1 to a8 has been excluded, which is a laser light unnecessary at the processing surface of the processing object 90) is dispersed and condensed as a plurality of laser lights having a weak energy less than the predetermined threshold X. Since the non-contribution light having a weak energy less than the threshold X is condensed to the condensing positions a9 to a28 existing in the non-processing region 92, the non-processing region 92 is not processed even after condensing and irradiation of the non-contribution light.

In addition, for easier understanding, if a total energy of an incident light is, for example, 13 GW/cm², in FIG. 8(a), a part of the incident light is condensed to the processing region 91, and the rest is dispersed and condensed as a plurality of laser lights having a weak energy to the non-processing region 92. More specifically, a laser light having a constant energy of, for example, 1 GW/cm² is condensed to each of the condensing positions a1 to a8 existing in the processing region 91. Then, a remaining laser light, that is, a laser light of 5 GW/cm² excluding, of 13 GW/cm² being a total energy of the incident light, 8 GW/cm² irradiated to the condensing positions a1 to a8 is dispersed every 0.250 GW/cm² (here, 5.0/20=0.250) and condensed to the 20 points of condensing positions a9 to a28 of the non-processing region 92.

FIG. 8(b) shows a state of a laser light output from the spatial light modulator 20 where three holograms have been sequentially presented being, by the condensing optical system 30, irradiated to 12 points of condensing positions b1 to b12 within the processing region 91, and irradiated to four points of condensing positions b13 to b16 within the non-processing region 92. At the 12 points of condensing positions b1 to b12 existing in the processing region 91, a part of the incident light is condensed as a contribution light having a constant energy not less than a predetermined threshold X. Since the laser light having an energy not less than the threshold X is condensed, a part of the processing region 91 to which the laser light has been condensed and irradiated is processed with a pattern of vertical bars of the character "H" and character "T" after the condensing and irradiation of the laser light. On the other hand, at the four points of condensing positions b13 to b16 existing in the non-processing region 92, a remaining part of the incident light (that is, the incident light from which the part of laser light condensed to the condensing positions b1 to b12 has been excluded, which is a laser light unnecessary at the processing surface of the processing object 90) is dispersed and condensed as a plurality of laser lights having a weak energy less than the predetermined threshold X. Since the non-contribution light having a weak energy less than the threshold X is condensed to the condensing positions b13 to b16 existing in the non-processing region 92, the non-processing region 92 is not processed even after condensing and irradiation of the non-contribution light.

In the above-described example where a total energy of an incident light is assumed as, for example, 13 GW/cm², a part of the incident light is condensed to the processing region 91, and the rest is dispersed and condensed as a plurality of laser lights having a weak energy to the non-processing region 92 in FIG. 8(b). More specifically, a laser light having a constant energy of, for example, 1 GW/cm² is condensed to each of the condensing positions b1 to b12 existing in the processing region 91. Then, a remaining laser light, more specifically, a laser light of 1 GW/cm² excluding, of 13 GW/cm² being a total energy of the irradiated laser light, 12 GW/cm$^2$ irradiated to the condensing positions b1 to b12 is dispersed every 0.250 GW/cm$^2$ (here, 1.0/4=0.250) and condensed to the four points of condensing positions b13 to b16 of the non-processing region 92.

FIG. 8(c) shows a state of a laser light output from the spatial light modulator 20 where three holograms have been sequentially presented being, by the condensing optical system 30, irradiated to nine points of condensing positions c1 to c9 within the processing region 91, and irradiated to 16 points of condensing positions c10 to c25 within the non-processing region 92. At the nine points of condensing positions c1 to c9 existing in the processing region 91, a part of the incident light is condensed as a contribution light having a constant energy not less than a predetermined threshold X. Since the laser light having an energy not less than the threshold X is condensed, a part of the processing region 91 to which the laser light has been condensed and irradiated is processed with a pattern of two oblique bars of the character "V" after the condensing and irradiation of the laser light. On the other hand, at the 16 points of condensing positions c10 to c25 existing in the non-processing region 92, a remaining part of the incident light (that is, the incident light from which the part of laser light condensed to the condensing positions c1 to c9 has been excluded, which is a laser light unnecessary at the processing surface of the processing object 90) is dispersed and condensed as a plurality of laser lights having a weak energy less than the predetermined threshold X. Since the non-contribution light having a weak energy less than the threshold X is condensed to the condensing positions c10 to c25 existing in the non-processing region 92, the non-processing region 92 is not processed even after condensing and irradiation of the non-contribution light.

In the above-described example where a total energy of an incident light is assumed as, for example, 13 GW/cm$^2$, a part of the incident light is condensed to the processing region 91, and the rest is dispersed and condensed as a plurality of laser lights having a weak energy to the non-processing region 92 in FIG. 8(c). More specifically, a laser light having a constant energy of, for example, 1 GW/cm$^2$ is condensed to each of the condensing positions c1 to c9 existing in the processing region 91. Then, a remaining laser light, more specifically, a laser light of 4 GW/cm$^2$ excluding, of 13 GW/cm$^2$ being a total energy of the irradiated laser light, 9 GW/cm$^2$ irradiated to the condensing positions c1 to c9 is dispersed every 0.250 GW/cm$^2$ (here, 4.0/16=0.250) and condensed to the 16 points of condensing positions c10 to c25 of the non-processing region 92.

Thus, even in the case of not processing the characters one by one in the order of "H," "T," and "V," but processing in a predetermined order, by treating an unnecessary light as a non-contribution light having an energy less than a predetermined threshold X so as not to contribute to processing, even when the number of condensing positions in the processing region varies, the energy of a contribution light can be maintained constant, and therefore, processing unevenness can be suppressed irrespective of the character.

Moreover, the third mode, as well as the second mode, when the energy of an incident light is great, allows appropriately setting the size of a laser light irradiation energy at the respective condensing positions existing in the processing region 91, and is thus preferable. When the energy of an incident light is great, by increasing the number of condensing positions (for example, b13 to b16) existing in the non-processing region 92, the size of a laser light irradiation energy at the respective condensing positions existing in the processing region 91 can be appropriately maintained.

[Laser Processing Method, Fourth Mode]

Figure 9:
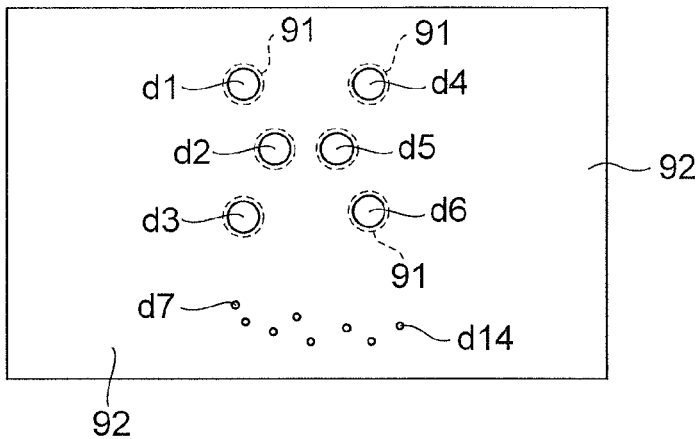
FIG. 9 are views explaining a fourth mode of a laser processing method according to the first embodiment.
Figure 9:
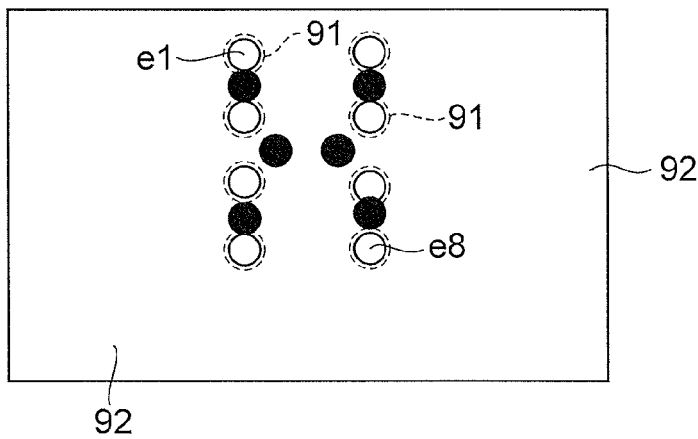
Figure 9:
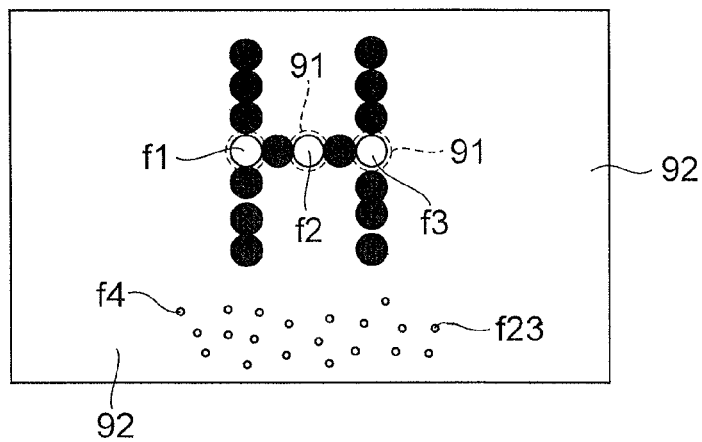

FIG. 9 are views explaining a fourth mode of the laser processing method according to the first embodiment. In each of FIG. 9(a) to FIG. 9(c), the white circles indicate laser light condensing positions, and the black circles indicate already processed positions. Here, laser light is condensed and irradiated to the processing region 91 and the non-processing region 92 of the processing object 90 so as to carry out a multi-point display of a single alphabetical character of "H" to process the processing object 90. Moreover, a part of the character "H" is first processed, another part of the character "H" is then processed, and the remaining part of the character "H" is lastly processed.

FIG. 9(a) shows a state of a laser light output from the spatial light modulator 20 being, by the condensing optical system 30, irradiated to six points of condensing positions d1 to d6 within the processing region 91, and irradiated to eight points of condensing positions d7 to d14 within the non-processing region 92. At the six points of condensing positions d1 to d6 existing in the processing region 91, a part of the incident light is condensed as a contribution light having a constant energy not less than a predetermined threshold X. Since the laser light having an energy not less than the threshold X is condensed to the condensing positions d1 to d6 existing in the processing region 91, the processing region 91 is processed after condensing and irradiation of the laser light. On the other hand, at the eight points of condensing positions d7 to d14 existing in the non-processing region 92, a remaining part of the incident light (that is, the incident light from which the part of laser light condensed to the condensing positions d1 to d6 has been excluded, which is a laser light unnecessary at the processing surface of the processing object 90) is dispersed and condensed as a plurality of laser lights having a weak energy less than the predetermined threshold X. Since the non-contribution light having a weak energy less than the threshold X is condensed to the condensing positions d7 to d14 existing in the non-processing region 92, the non-processing region 92 is not processed even after condensing and irradiation of the non-contribution light.

In addition, for easier understanding, if a total energy of an incident light is, for example, 8 GW/cm$^2$, in FIG. 9(a), a part of the incident light is condensed to the processing region 91, and the rest is dispersed and condensed as a plurality of laser lights having a weak energy to the non-processing region 92. More specifically, a laser light having a constant energy of, for example, 1 GW/cm$^2$ is condensed to each of the condensing positions d1 to d6 existing in the processing region 91. Then, a remaining laser light, that is, a laser light of 2 GW/cm$^2$ excluding, of 8 GW/cm$^2$ being a total energy of the incident light, 6 GW/cm$^2$ irradiated to the condensing positions d1 to d6 is dispersed every 0.250 GW/cm$^2$ (here, 2.0/8=0.250) and condensed to the four points of condensing positions d7 to d14 of the non-processing region 92.

FIG. 9(b) shows a state of a laser light output from the spatial light modulator 20 being, by the condensing optical system 30, entirely irradiated to eight points of condensing positions e1 to e8 within the processing region 91. To the eight points of condensing positions e1 to e8 existing in the processing region 91, the entire part of the incident light is condensed as a contribution light having a constant energy not less than a predetermined threshold X. Since the laser light having an energy not less than the threshold X is condensed to the condensing positions e1 to e8 existing in the processing region 91, the processing region 91 is processed after condensing and irradiation of the laser light.

In the above-described example where a total energy of an incident light is assumed as, for example, 8 GW/cm$^2$, the incident light is entirely condensed to the processing region 91 in FIG. 9(*b*). More specifically, a laser light having a constant energy of, for example, 1 GW/cm$^2$ is condensed to each of the condensing positions e1 to e8 existing in the processing region 91.

FIG. 9(*c*) shows a state of a laser light output from the spatial light modulator 20 being, by the condensing optical system 30, irradiated to three points of condensing positions f1 to f3 within the processing region 91, and irradiated to 20 points of condensing positions f4 to f23 within the non-processing region 92. At the three points of condensing positions f1 to f3 existing in the processing region 91, a part of the incident light is condensed as a contribution light having a constant energy not less than a predetermined threshold X. Since the laser light having an energy not less than the threshold X is condensed to the condensing positions f1 to f3 existing in the processing region 91, the processing region 91 is processed after condensing and irradiation of the laser light. On the other hand, at the 20 points of condensing positions f4 to f23 existing in the non-processing region 92, a remaining part of the incident light (that is, the incident light from which the part of laser light condensed to the condensing positions f1 to f3 has been excluded, which is a laser light unnecessary at the processing surface of the processing object 90) is dispersed and condensed as a plurality of laser lights having a weak energy less than the predetermined threshold X. Since the non-contribution light having a weak energy less than the threshold X is condensed to the condensing positions f4 to f23 existing in the non-processing region 92, the non-processing region 92 is not processed even after condensing and irradiation of the non-contribution light.

In the above-described example where a total energy of an incident light is assumed as, for example, 8 GW/cm$^2$, a part of the incident light is condensed to the processing region 91, and the rest is dispersed and condensed as a plurality of laser lights having a weak energy to the non-processing region 92 in FIG. 9(*c*). More specifically, a laser light having a constant energy of, for example, 1 GW/cm$^2$ is condensed to each of the condensing positions f1 to f3 existing in the processing region 91. Then, a remaining laser light, more specifically, a laser light of 5 GW/cm$^2$ excluding, of 8 GW/cm$^2$ being a total energy of the incident light, 3 GW/cm$^2$ irradiated to the condensing positions f1 to f3 is dispersed every 0.250 GW/cm$^2$ (here, 5.0/20=0.250) and condensed to the 20 points of condensing positions f4 to f23 of the non-processing region 92.

Thus, even in the case of processing the character of "H" in three steps, for each time, by treating an unnecessary light as a non-contribution light having an energy less than a predetermined threshold X so as not to contribute to processing, even when the number of condensing positions in the processing region varies, the energy of a contribution light can be maintained constant, and therefore, processing unevenness can be suppressed for each time.

[Laser Processing Method, Fifth Mode]

Figure 10:
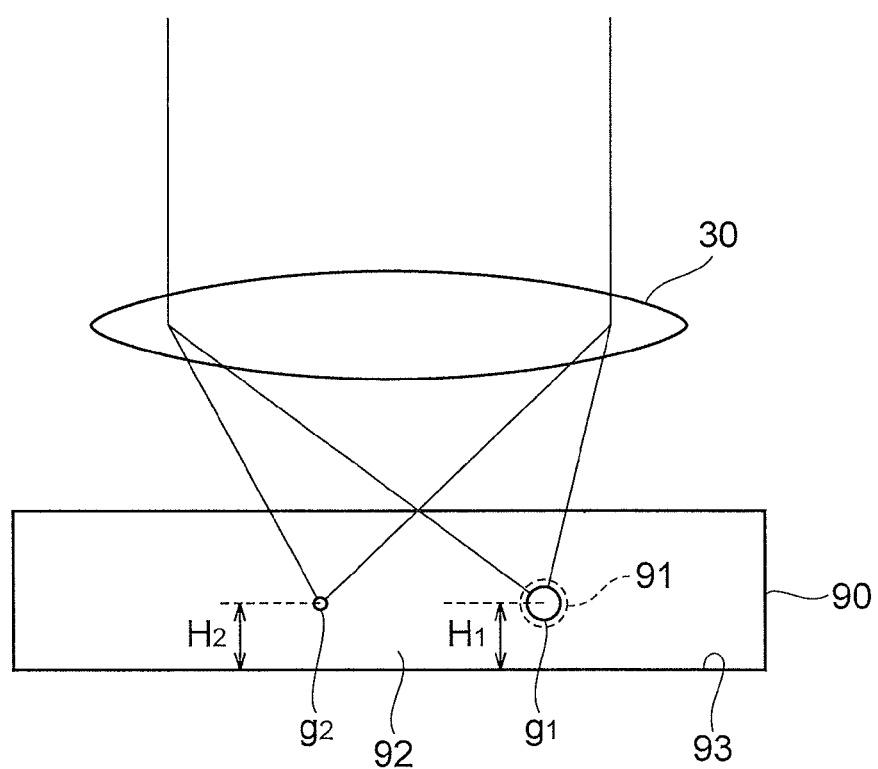
FIG. 10 is a view explaining a fifth mode of a laser processing method according to the first embodiment.
Figure 11:
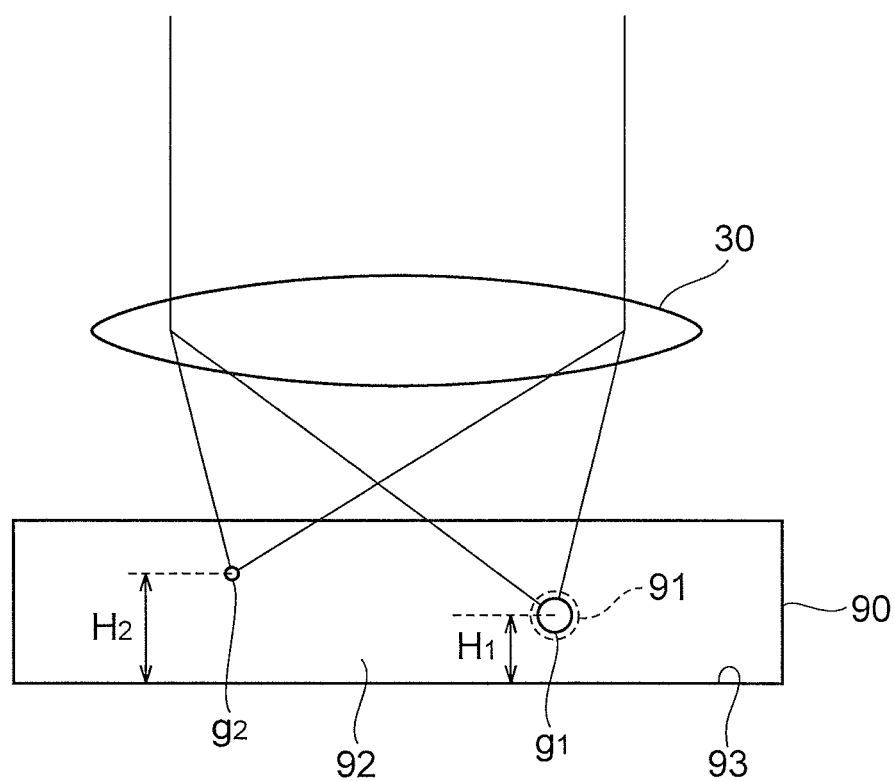
FIG. 11 is a view explaining a fifth mode of a laser processing method according to the first embodiment.

FIG. 10 and FIG. 11 are views explaining a fifth mode of the laser processing method according to the first embodiment. FIG. 10 and FIG. 11 clearly show that the processing region 91 may be provided not only on the surface of an upper surface of the processing object 90 but also inside of the processing object 90. Further, in this case, the control section 22 may, as shown in FIG. 10, cause the spatial light modulator 20 to present a hologram via the drive section 21 so that the height $H_1$ of a condensing position g1 existing in the processing region 91 with reference to a bottom surface 93 of the processing object 90 and the height $H_2$ of a condensing position g2 existing in the non-processing region 92 with reference to the bottom surface 93 become equal to each other.

Alternatively, the control section 22 may, as shown in FIG. 11, cause the spatial light modulator 20 to present a hologram via the drive section 21 so that the height $H_1$ of a condensing position g1 existing in the processing region 91 with reference to a bottom surface 93 of the processing object 90 and the height $H_2$ of a condensing position g2 existing in the non-processing region 92 with reference to the bottom surface 93 are different from each other. Also, in FIG. 10 and FIG. 11, for simple description, the condensing position g1 existing in the processing region 91 and the condensing position g2 existing in the non-processing region 92 are only displayed one each, but in actuality, the condensing positions g1 and g2 may be each in plural numbers as shown in FIG. 6 to FIG. 9. Moreover, the matters other then the above are in common with the first mode.

Also in the fifth mode like this, a laser light output from the spatial light modulator 20 where a predetermined hologram has been presented is, by the condensing optical system 30, in a part of the incident light, condensed as a contribution light having a constant energy not less than a predetermined threshold X at the condensing position g1 existing in the processing region 91, while condensed as a non-contribution light having an energy less than the threshold X at the condensing position g2 existing in the non-processing region 92. Thus, even when the processing region 91 is provided not only on the surface of an upper surface of the processing object 90 but also inside of the processing object 90, by treating an unnecessary light as a non-contribution light having an energy less than a predetermined threshold X so as not to contribute to processing, even when the number of condensing positions in the processing region varies, the energy of a contribution light can be maintained constant, and therefore, processing unevenness can be suppressed.

[Hologram Alteration Method]

Figure 12:
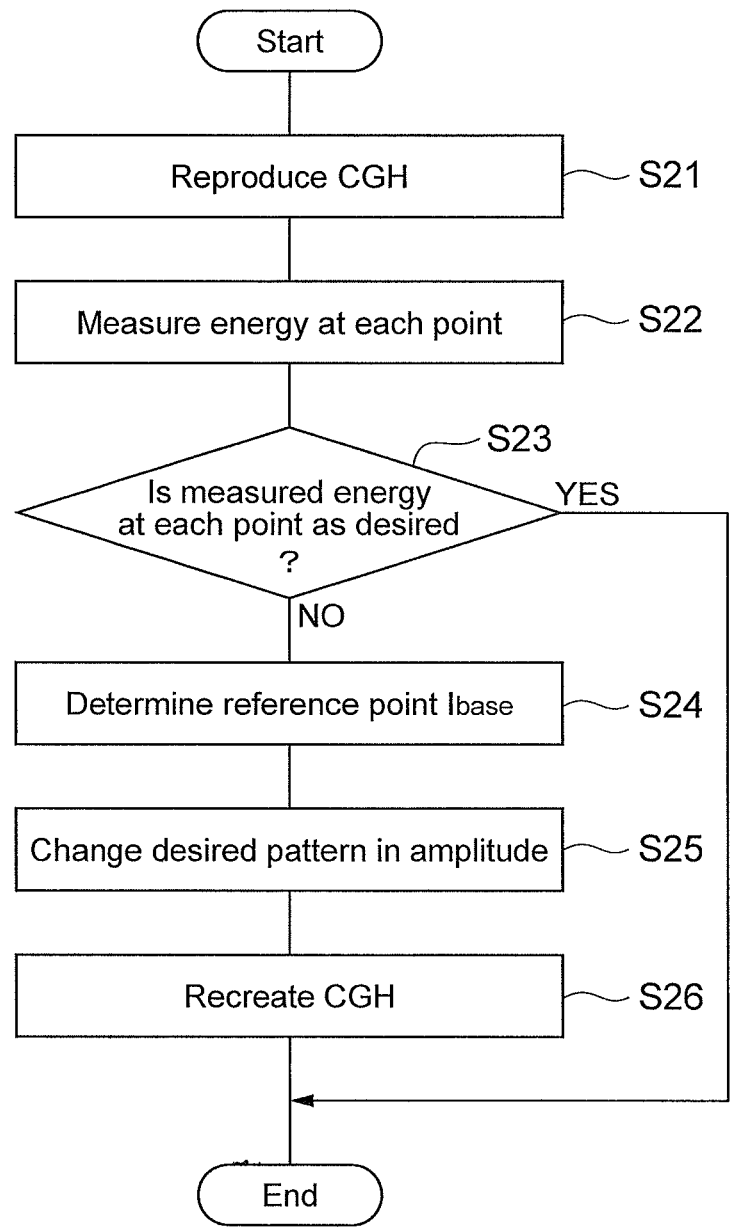
FIG. 12 is a flowchart of a hologram alteration method in the first embodiment.

Holograms can be created by the GS method, the ORA method, or the like as described above, but when the spatial light modulator 20 is caused to present the created respective holograms, and a laser light output after being phase-modulated by the spatial light modulator 20 is caused to be condensed to predetermined condensing positions by the condensing optical system 30, in actuality, there is a case where the energy of laser light at the respective condensing positions within the processing region 91 is not constant. In such a case, it is necessary to alter by feedback holograms created by the above-described method. FIG. 12 is a flowchart of a hologram alteration method in the first embodiment.

For altering a hologram, the spatial light modulator 20 is caused to present the hologram, a laser light output after being phase-modulated by the spatial light modulator 20 is caused to be condensed to predetermined condensing positions by the condensing optical system 30 (step S21), and the energy of laser light at the respective condensing positions is measured by a CCD (Charge Coupled Device) (step S22). If the measured energy of laser light at the respective condensing positions is as desired (Yes in step S23), the process ends here. On the other hand, if the measured energy of laser light at the respective condensing positions is not as desired (No in step S23), the energy $I_{base}$ of a reference point of any of the condensing positions of measurement is determined (step S24), the amplitude of a laser light that needs to be reproduced at the respective condensing positions in a desired pattern is changed in accordance therewith (step S25), and a computer-generated hologram is recreated (step S26).

The energy of laser light at the respective condensing positions measured in step S22 is provided as $I_n$. In step S25, a ratio ($=I_n/I_{base}$) of the energy $I_{base}$ of the reference point determined in step S24 and the energy $I_n$ of the respective condensing positions is determined, and a tone $t_n$ of the respective points after alteration is determined, with the tone of a point used as a base in an original pattern as $t_{base}$, by a formula "$t_n = t_{base}(I_{base}/I_n)^{1/2}$." Then, in step S26, based on the tone $t_n$ of the respective points after alteration, a computer-generated hologram is recreated by the GS method, the ORA method, or the like.

In addition, feedback of the ORA method has been described in "Hidetomo Takahashi, Satoshi Hasegawa, and Yoshio Hayasaki, 'Holographic femtosecond laser processing using optimal-rotation-angle method with compensation of spatial frequency response of liquid crystal spatial frequency response of liquid crystal spatial light modulator.' Applied Optics, Vol. 46, Issue 23, pp. 5917-5923."

Such a hologram alteration by feedback can be applied also to when intentionally making the laser light energy nonuniform at laser light condensing positions in the processing region 91 at each time of processing.

Second Embodiment

Next, description will be given of a second embodiment of a laser processing device and a laser processing method according to the present invention. There is a difference in that the unit of condensing and processing is a "dot (point, condensing position)" in the foregoing first embodiment, while the unit of condensing and processing is not a "dot" but a "pattern (condensing region) having a constant area" in the second embodiment. In addition, this phrase "pattern having a constant area" connotes a "line." Moreover, since the second embodiment is basically the same as the foregoing first embodiment except that the unit of condensing and processing is not a "dot" but a "pattern having a constant area," a brief description will be given mainly of the difference from the first embodiment in the following.

[Configuration of Laser Processing Device 1]

The overall configuration of the laser processing device 1 according to the second embodiment is almost the same as that shown in FIG. 1. However, there is a difference in the function of the control section 22. More specifically, the control section 22 according to the second embodiment causes the spatial light modulator 20 to sequentially present a plurality of holograms. Then, the control section 22, when having made a phase-modulated laser light output from the spatial light modulator 20 where a plurality of holograms have been respectively presented be input to the condensing optical system 30, in a condensing region existing in the processing region 91 of a predetermined condensing region of the processing object 90, causes a part of the phase-modulated laser light to be condensed as a laser light (contribution light) having a constant energy not less than a predetermined threshold X. On the other hand, the control section 22, in a condensing region existing in the non-processing region 92 of the predetermined condensing region of the processing object 90, causes a remaining part of the phase-modulated laser light to be condensed as a laser light (non-contribution light) having a weak energy less than the threshold X to thereby process the processing object 90.

[Laser Processing Method, Corresponding to First Mode of First Embodiment]

Figure 13:
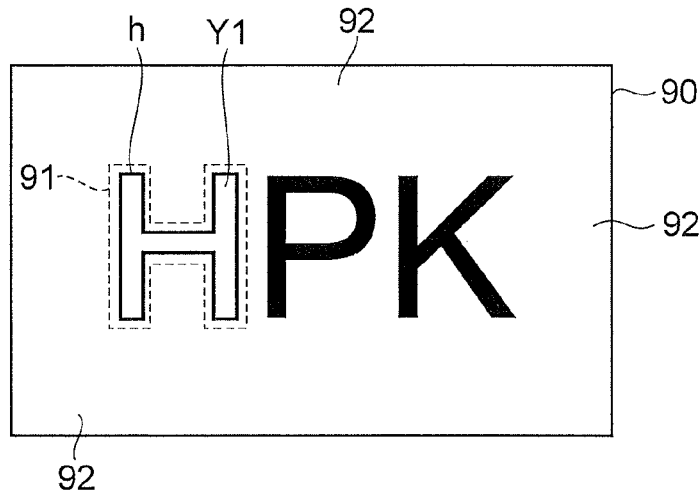
FIG. 13 are views explaining a laser processing method according to a second embodiment.
Figure 13:
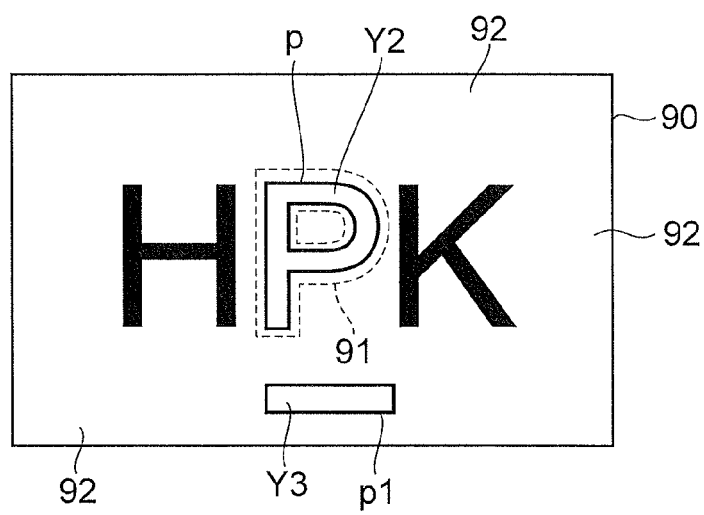
Figure 13:
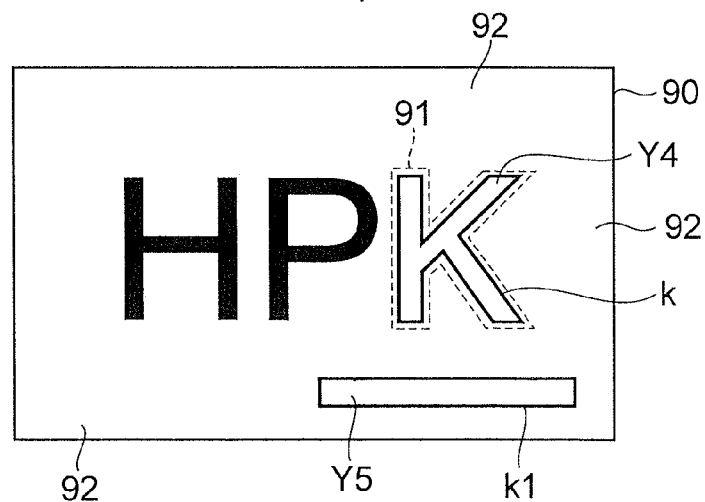

The same as in the first mode of the laser processing method according to the first embodiment described above applies to the second embodiment where the unit of condensing and processing is not a "dot" but a "pattern having a constant area." FIG. 13 are views for explaining the same. FIG. 13(*a*) shows a state of laser light being, in order to process the character "H," irradiated to a condensing region (pattern h) having an area Y1 within the processing region 91. The condensing region (pattern h) having an area Y1 shown in FIG. 13(*a*) exists in its entirety within the processing region 91, and the entire part of the incident light is irradiated as a contribution light having a constant energy not less than a predetermined threshold X to the pattern h. Since the laser light having an energy not less than the threshold X is condensed, a part of the processing region 91 to which the laser light has been condensed and irradiated is processed with a pattern of the character "H" after the condensing and irradiation of the laser light. In addition, as in the first embodiment, the character "H" (a "predetermined processing region" in the claims) requires the greatest energy for processing among the characters "H," "P," and "K" of FIG. 13, and FIG. 13(*a*) is a case where a laser light having the same energy as that required for processing of the character "H" is made incident.

FIG. 13(*b*) shows a state of laser light being, in order to process the character "P," irradiated to a condensing region (pattern p) having an area Y2 within the processing region 91, and irradiated to a condensing region (pattern p1) having an area Y3 within the non-processing region 92. In the condensing region (pattern p) having an area Y2 existing in the processing region 91, a part of the incident light is condensed as a contribution light having a constant energy not less than a predetermined threshold X. Since the laser light having an energy not less than the threshold X is condensed, a part of the processing region 91 to which the laser light has been condensed and irradiated is processed with a pattern of the character "P" after the condensing and irradiation of the laser light. On the other hand, in the condensing region (pattern p1) having an area Y3 existing in the non-processing region 92, a remaining part of the incident light (that is, the incident light from which the part of laser light condensed to the pattern p has been excluded, an unnecessary light) is condensed as a laser light having a weak energy less than the predetermined threshold X.

FIG. 13(*c*) shows a state of laser light being, in order to process the character "K," irradiated to a condensing region (pattern k) having an area Y4 within the processing region 91, and irradiated to a condensing region (pattern k1) having an area Y5 within the non-processing region 92. In the condensing region (pattern k) having an area Y4 existing in the processing region 91, a part of the incident light is condensed as a contribution light having a constant energy not less than a predetermined threshold X. Since the laser light having an energy not less than the threshold X is condensed, a part of the processing region 91 to which the laser light has been condensed and irradiated is processed with a pattern of the character "K" after the condensing and irradiation of the laser light. On the other hand, in the condensing region (pattern k1) having an area Y5 existing in the non-processing region 92, a remaining part of the incident light (that is, the incident light from which the part of laser light condensed to the pattern k has been excluded, an unnecessary light) is condensed as a laser light having a weak energy less than the predetermined threshold X.

In the above description referring to FIG. 13, Y1, Y2, and Y4 are examples of the area of a condensing region existing within the processing region 91, and the size relationship among these is, for example, Y1>Y2>Y4. In addition, when the size relationship among Y1, Y2, and Y4 is paraphrased, it can be assumed in association with the first mode (FIG. 6) of the first embodiment described above that, for example, the area Y1 is an area for 12 dots, the area Y2 is an area for 11 dots, and the area Y4 is an area for 10 dots. In this case, where a total energy of a laser light to be irradiated to the processing object 90 is, for example, 12.0 GW/cm$^2$, a laser light having a constant energy (1 GW/cm$^2$) not less than the threshold X is condensed to the pattern h for 12 dots (12 GW/cm$^2$). A laser light having a constant energy (1 GW/cm$^2$) not less than the threshold X is condensed to the pattern p for 11 dots (11 GW/cm$^2$), while an unnecessary light for one dot is condensed in the pattern p1 as a non-contribution light having a weak energy (0.250 GW/cm$^2$) less than the predetermined threshold X. A laser light having a constant energy (1 GW/cm$^2$) not less than the threshold X is condensed to the pattern k for 10 dots (10 GW/cm$^2$), while an unnecessary light for two dots is condensed in the pattern k1 as a non-contribution light having a weak energy (0.250 GW/cm$^2$) less than the predetermined threshold X. Since an unnecessary light twice as much as that in the pattern p1 is condensed in the pattern k1, the area Y5 is twice as large as the area Y3. In addition, no unnecessary light is generated in the processing of the character "H," and the incident light is entirely condensed to the pattern h as a contribution light.

In the mode described above, a laser light output from the spatial light modulator 20 where holograms corresponding to "H," "P," and "K," respectively, have been sequentially presented is, by the condensing optical system 30, condensed in the condensing region (pattern h, p, k) existing in the processing region 91 as a contribution light having a constant energy not less than a predetermined threshold X, while at the condensing region (pattern p1, k1) existing in the non-processing region 92, condensed as a non-contribution light having an energy less than the threshold X. Thus, even in the case of not processing the characters one by one in the order of "H," "P," and "K" not as a dot but as a pattern, by treating an unnecessary light as a non-contribution light having an energy less than a predetermined threshold X so as not to contribute to processing, even when the area of a condensing region in the processing region varies, the energy of a contribution light can be maintained constant, and therefore, processing unevenness can be suppressed irrespective of the character.

[Corresponding to Other Matters of First Embodiment]

Figure 14:
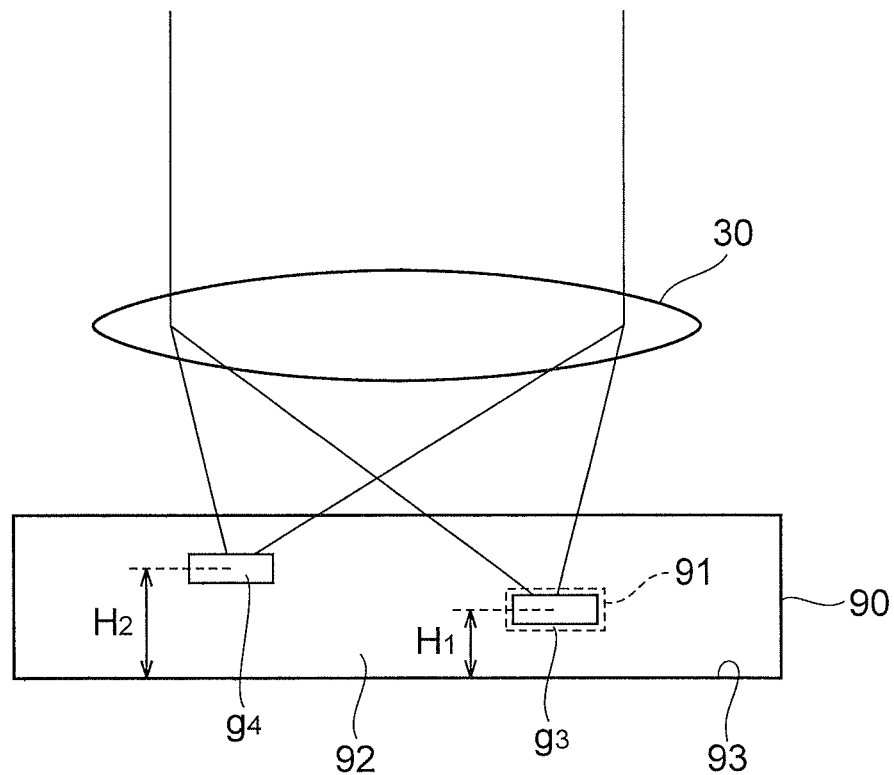
FIG. 14 is a view explaining a laser processing method according to a second embodiment.

By the above, with the fact in mind that the unit of condensing and processing is not a "dot (point, condensing position)" but a "pattern (condensing region) having a constant area," a description has been given of that the same as in the first mode of the laser processing method according to the first embodiment applies to the second embodiment. When the above description is taken into consideration, those skilled in the art will easily understand that, with regard also to other matters of the first embodiment, that is, the second mode, the third mode, the fourth mode, and the fifth mode of the laser processing method according to the first embodiment and the hologram alteration method, with the fact in mind that the unit of condensing and processing is not "a dot" but "a pattern" having a constant area, the same applies to the second embodiment. However, it is preferable for easy understanding to replace, in the respective descriptions of the first embodiment, the description of a "condensing position" with a "condensing region," and the description of "a plurality of condensing positions" with "a predetermined condensing region." Particularly, in the fifth mode of the first embodiment, considering the condensing positions g1 and g2 described by displaying with dots in FIG. 10 and FIG. 11 as patterns g3 and g4 having constant areas as shown in FIG. 14 allows easy understanding.

Example 1

Figure 15:
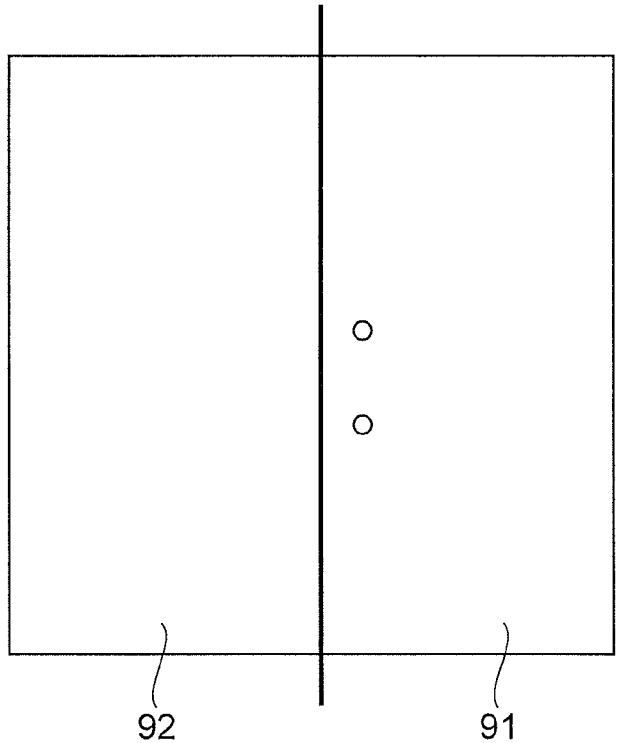
FIG. 15 are views explaining a comparative example, in explanation of Example 1.
Figure 15:
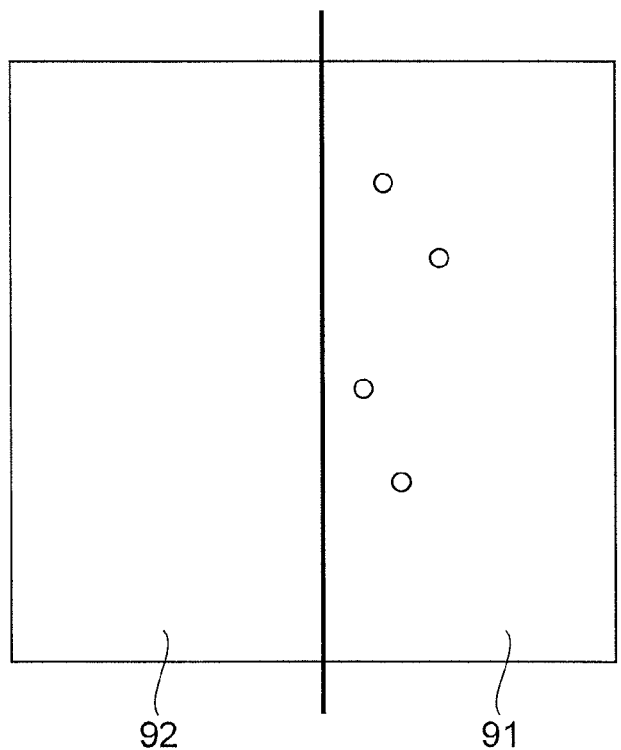

Here, assumed is a case of first processing at two points of condensing positions within the processing region 91, and then processing at four points of condensing positions within the processing region 91. In a comparative example, as shown in FIG. 15, the total number of condensing positions within the processing region 91 is first provided as 2 (FIG. 15(a)), and the total number of condensing positions within the processing region 91 is then provided as 4 (FIG. 15(b)). Since treating unnecessary light is of course not considered, no condensing position exists in the non-processing region 92 in FIG. 15 as a whole. On the other hand, in Example 1, two points of condensing positions in the processing region 91 and eight points of condensing positions in the non-processing region 92 are first provided (FIG. 16(a)), and four points of condensing positions in the processing region 91 and zero points of condensing positions in the non-processing region 92 are then provided (FIG. 16(b)).

Figure 16:
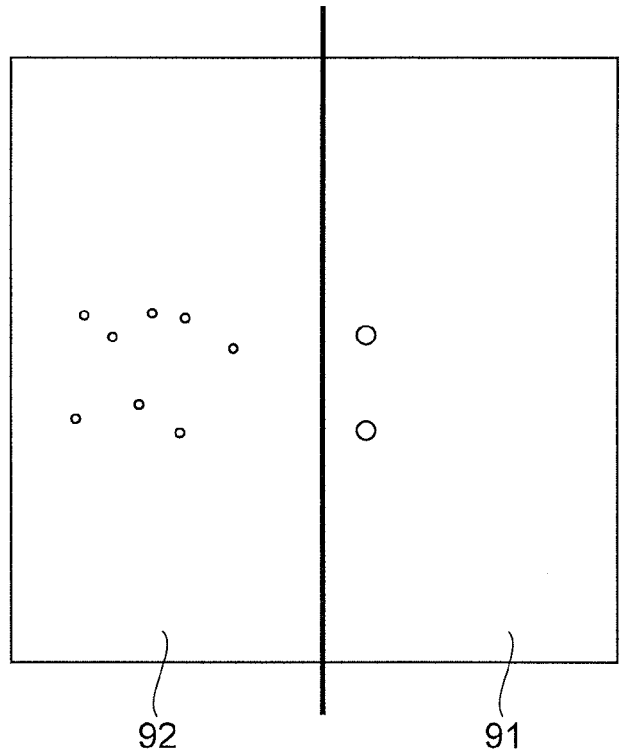
FIG. 16 are views explaining Example 1.
Figure 16:
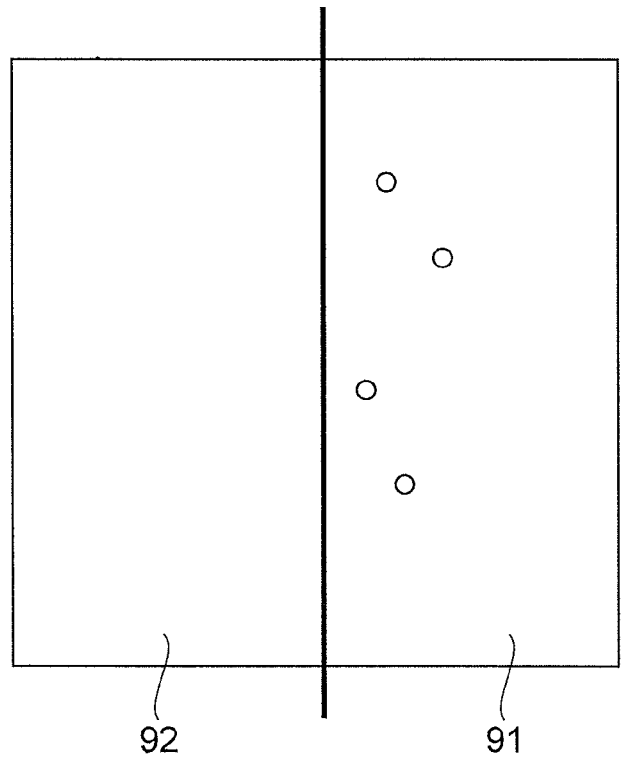

FIG. 17 is a table summarizing laser light energies at respective condensing positions in the comparative example. It can be understood that, in the comparative example, the total energy of incident light is approximately 4 GW/cm$^2$, and the energy of laser light for processing differs between when the processing is performed at two points and when the processing is performed at four points (such as, for example, 2 GW/cm$^2$ and 1 GW/cm$^2$ in terms of point 1). Due to a change in light energy, uniform processing is difficult. On the other hand, FIG. 18 is a table summarizing laser light energies at respective condensing positions in Example 1. It can be understood that, in Example 1, the total energy of incident light is approximately 4 GW/cm$^2$, and even when the number of condensing positions in the processing region 91 varies, since a remaining unnecessary light is appropriately treated in the non-processing region 92, the laser light energy at the respective condensing positions within the processing region 91 is almost constant (almost constant within a range of 0.990 GW/cm$^2$ to 1.020 GW/cm$^2$). In FIG. 16(a), unnecessary lights for two condensing positions are generated as compared with FIG. 16(b), but these are treated in the non-processing region 92 as eight points of non-contribution lights each having a weak energy (approximately 0.250 GW/cm$^2$) of approximately one-fourth. Also, in FIG. 15 and FIG. 16, a difference in the energy of laser light is expressed proportional to the size of white circles.

Example 2

Figure 19:
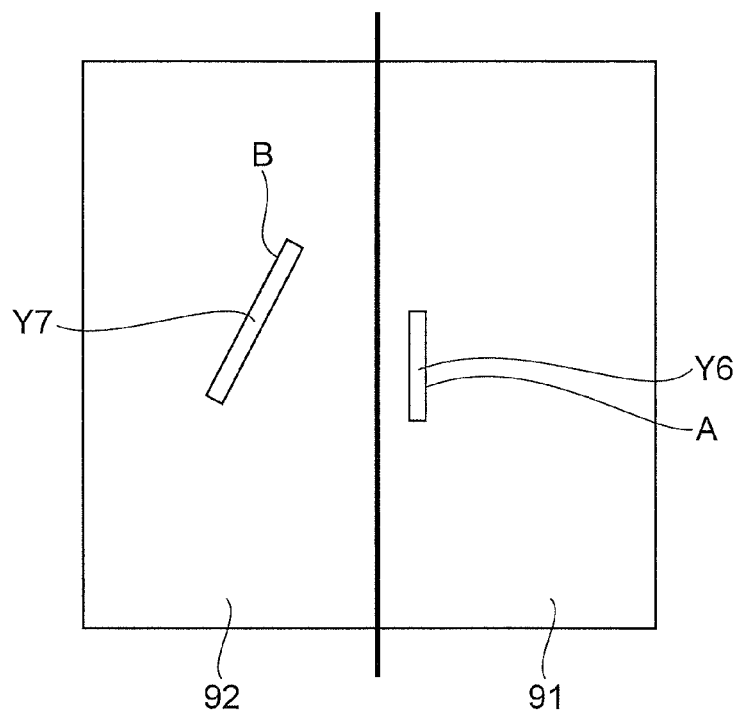
FIG. 19 are views explaining Example 2.
Figure 19:
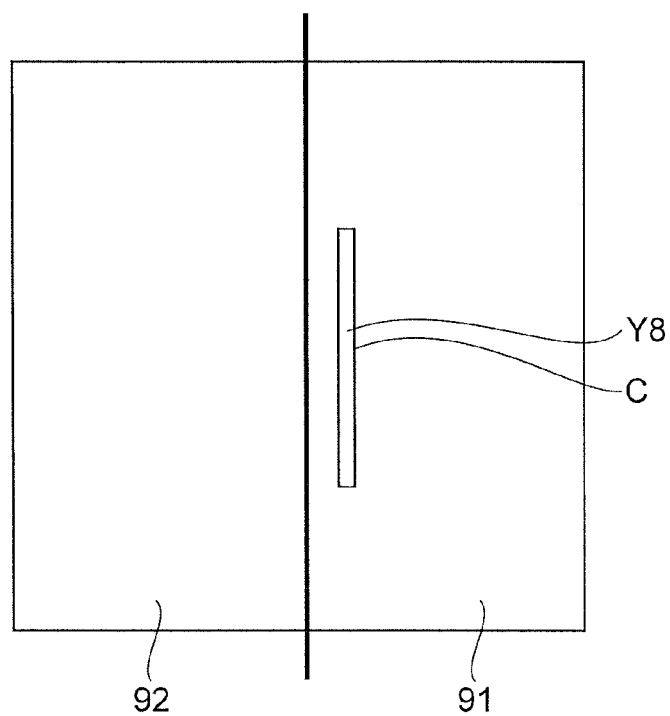

Example 2 is carried out under all the same conditions as those of Example 1 described above, but there is a difference in that the unit of condensing and processing is not a "dot" but a "pattern having a constant area." More specifically, in Example 2, as shown in FIG. 19, first, the condensing region in the processing region 91 is provided as a linear pattern A having an area Y6, and the condensing region in the non-processing region 92 is provided as a pattern B having an area Y7 (FIG. 19(a)). Then, the condensing region in the processing region 91 is provided as a linear pattern C having an area Y8, and no condensing region is provided in the non-processing region 92 (FIG. 19(b). However, Y6 and Y8 are examples of the area of a condensing region existing within the processing region 91, and the size relationship between these is, for example, Y6<Y8. In addition, when the size relationship between Y6 and Y8 is paraphrased, it can be assumed in association with Example 1 described above that, for example, the area Y6 is an area for two dots, and the area Y8 is an area for four dots. In this case, unnecessary lights for two dots are generated in FIG. 19(a) as compared with FIG. 19(b), but these are treated in the pattern B having an area Y7 in the non-processing region 92 as non-contribution lights each having a weak energy of approximately one-fourth.

FIG. 20 is a table summarizing laser light energies in respective condensing regions in Example 2. It can be understood that, in Example 2, even when the area of a condensing region in the processing region 91 varies, since a remaining unnecessary light is appropriately treated in the non-processing region 92, the laser light energy in the respective condensing regions (pattern A and pattern C) within the processing region 91 is almost constant (an energy equivalent to one dot is $1.0$ GW/cm$^2$ or $1.010$ GW/cm$^2$, which is almost constant). Moreover, the laser light energy in a condensing region (pattern B) within the non-processing region 92 is less than a predetermined threshold X (an energy equivalent to one dot is $0.250$ GW/cm$^2$) so as not to contribute to processing. Also, in the above example, since the area Y6 of the pattern A is an area for two dots, a total energy of a laser light to be condensed to the pattern A is $2$ GW/cm$^2$. Moreover, since the area Y8 of the pattern C is an area for four dots, a total energy of a laser light to be condensed to the pattern C is $4.040$ GW/cm$^2$.

INDUSTRIAL APPLICABILITY

The present invention provides a laser processing device and a laser processing method that allow maintaining the energy of laser light to be irradiated to a condensing position or condensing region existing in a processing region almost constant.

The invention claimed is:

1. A laser processing device, which is a device configured to process a processing object by condensing and irradiating laser light to the processing object, comprising:
   a laser light source configured to output laser light;
   a phase modulating spatial light modulator configured to be input with the laser light, present a hologram configured to modulate the phase of the laser light in each of a plurality of two-dimensionally arrayed pixels, and output the phase-modulated laser light;
   a condensing optical system provided at a subsequent stage of the spatial light modulator; and
   a control section configured to cause the spatial light modulator to present the hologram configured to condense the phase-modulated laser light to a plurality of condensing positions by the condensing optical system,
   the control section causing the spatial light modulator to present holograms such that a part of the phase-modulated laser light to be condensed at condensing positions in a processing region of the processing object is laser light having constant intensity not less than a predetermined threshold, and a remaining part of the phase-modulated laser light to be condensed at condensing positions in a non-processing region of the processing object is a plurality of laser lights having intensity more than 0 and less than the threshold, thereby processing the processing object,
   wherein the predetermined intensity is enough to process the processing object.

2. The laser processing device according to claim 1, wherein when intensity of the phase-modulated laser light is the same as intensity configured to process a predetermined processing region that requires the greatest intensity configured to process,
   the control section causes the entire part of the phase-modulated laser light to be condensed, as a plurality of laser lights having a constant intensity not less than the threshold, to a plurality of condensing positions existing in the predetermined processing region, respectively.

3. The laser processing device according to claim 1, wherein the processing region exists inside of the processing object, and
   a condensing position existing in the processing region with reference to a bottom surface of the processing object and a condensing position existing in a non-processing region with reference to the bottom surface are different in height from each other.

4. A laser processing method, which is a method configured to process a processing object by condensing and irradiating laser light to the processing object, using:
   a laser light source configured to output laser light;
   a phase modulating spatial light modulator configured to be input with the laser light, present a hologram configured to modulate the phase of the laser light in each of a plurality of two-dimensionally arrayed pixels, and output the phase-modulated laser light;
   a condensing optical system provided at a subsequent stage of the spatial light modulator; and
   a control section configured to cause the spatial light modulator to present the hologram configured to condense the phase-modulated laser light to a plurality of condensing positions by the condensing optical system,
   wherein the laser processing method causes, by the control section:
   the spatial light modulator to sequentially present a plurality of holograms; and
   a part of the phase-modulated laser light that is condensed at condensing positions in a processing region of the processing object to be laser light having constant intensity not less than a predetermined threshold, and a remaining part of the phase-modulated laser light that is condensed at condensing positions in a non-processing region of the processing object to be a plurality of laser lights having intensity more than 0 and less than the threshold, thereby processing the processing object,
   wherein the predetermined intensity is enough to process the processing object.

5. The laser processing method according to claim 4, causing, when intensity of the phase-modulated laser light is the same as intensity configured to process a predetermined processing region that requires the greatest intensity configured to process,
   by the control section, the entire part of the phase-modulated laser light to be condensed, as a plurality of laser lights having constant intensity not less than the threshold, to a plurality of condensing positions existing in the predetermined processing region, respectively.

6. The laser processing method according to claim 4, wherein the processing region exists inside of the processing object, and
   a condensing position existing in the processing region with reference to a bottom surface of the processing object and a condensing position existing in a non-processing region with reference to the bottom surface are different in height from each other.

7. A laser processing device, which is a device configured to process a processing object by condensing and irradiating laser light to the processing object, comprising:
   a laser light source configured to output laser light;
   a phase modulating spatial light modulator configured to be input with the laser light, present a hologram configured to modulate the phase of the laser light in each of a plurality of two-dimensionally arrayed pixels, and output the phase-modulated laser light;
   a condensing optical system provided at a subsequent stage of the spatial light modulator; and a control section configured to cause the spatial light modulator to present the hologram configured to condense the phase-modulated laser light to a predetermined condensing region by the condensing optical system, the control section causing:

the spatial light modulator to sequentially present a plurality of holograms; and a part of the phase-modulated laser light that is condensed at condensing positions in a processing region of the processing object of the predetermined condensing region to be laser light having constant intensity not less than a predetermined threshold, and a remaining part of the phase-modulated laser light that is condensed at condensing positions in a non-processing region of the processing object of the predetermined condensing region to be laser light having intensity more than 0 and less than the threshold, thereby processing the processing object, wherein the predetermined intensity is enough to process the processing object.

8. The laser processing device according to claim 7, wherein when an intensity of the phase-modulated laser light is the same as an intensity configured to process a predetermined processing region that requires the greatest intensity configured to process, the control section causes the entire part of the phase-modulated laser light to be condensed, as laser light having a constant intensity not less than the threshold, to a condensing region existing in the predetermined processing region.

9. The laser processing device according to claim 7, wherein the processing region exists inside of the processing object, and a condensing region existing in the processing region with reference to a bottom surface of the processing object and a condensing region existing in a non-processing region with reference to the bottom surface are different in height from each other.

10. A laser processing method, which is a method configured to process a processing object by condensing and irradiating laser light to the processing object, using:

a laser light source configured to output laser light;

a phase modulating spatial light modulator configured to be input with the laser light, present a hologram configured to modulate the phase of the laser light in each of a plurality of two-dimensionally arrayed pixels, and output the phase-modulated laser light;

a condensing optical system provided at a subsequent stage of the spatial light modulator; and a control section configured to cause the spatial light modulator to present the hologram configured to condense the phase-modulated laser light to a predetermined condensing region by the condensing optical system, wherein the laser processing method causes, by the control section:

the spatial light modulator to sequentially present a plurality of holograms; and a part of the phase-modulated laser light that is condensed at condensing positions in a processing region of the processing object of the predetermined condensing region to be laser light having constant intensity not less than a predetermined threshold, and a remaining part of the phase-modulated laser light that is condensed at condensing positions in a non-processing region of the processing object of the predetermined condensing region to be laser light having intensity more than 0 and less than the threshold, thereby processing the processing object, wherein the predetermined intensity is enough to process the processing object.

11. The laser processing method according to claim 10, causing, when intensity of the phase-modulated laser light is the same as intensity configured to process a predetermined processing region that requires the greatest intensity configured to process, by the control section, the entire part of the phase-modulated laser light to be condensed, as laser light having constant intensity not less than the threshold, to a condensing region existing in the predetermined processing region.

12. The laser processing method according to claim 10, wherein the processing region exists inside of the processing object, and a condensing region existing in the processing region with reference to a bottom surface of the processing object and a condensing region existing in a non-processing region with reference to the bottom surface are different in height from each other.

13. A laser processing apparatus, comprising:

a laser light source configured to output laser light;

a spatial light modulator configured to modulate the laser light and output the modulated laser light; and a control section configured to cause the spatial light modulator to present a hologram configured to form a desired processing pattern and a non-contribution pattern, wherein the desired processing pattern is composed of modulated laser light at a condensing position in a processing region having intensity not less than a predetermined intensity, and the non-contribution pattern is composed of the modulated laser light at a condensing position in a non-processing region having intensity more than 0 and less than the predetermined intensity, wherein the predetermined intensity is enough to process an object.

14. A laser processing method, comprising:

outputting laser light from a laser light source;

modulating the laser light and outputting the modulated laser light by a spatial light modulator; and causing the spatial light modulator to present a hologram configured to form a desired processing pattern and a non-contribution pattern by a control section;

wherein the desired processing pattern to be composed of modulated laser light at a condensing position in a processing region having intensity not less than a predetermined intensity, and the non-contribution pattern to be composed of the modulated laser light at a condensing position in a non-processing region having intensity more than 0 and less than the predetermined intensity, wherein the predetermined intensity is enough to process an object.

* * * * *